United States Patent
Rydhmer et al.

(10) Patent No.: US 12,239,105 B2
(45) Date of Patent: Mar. 4, 2025

(54) METHOD AND APPARATUS FOR DETERMINING AN INDEX OF INSECT BIODIVERSITY, AN INSECT SENSOR AND A SYSTEM OF INSECT SENSORS

(71) Applicant: FaunaPhotonics Agriculture & Environmental A/S, Copenhagen SV (DK)

(72) Inventors: Klas Rydhmer, Malmö (SE); Thomas Nikolajsen, Slangerup (DK); Laurence Still, Copenhagen S (DK); Mikkel Brydegaard Sörensen, Lund (SE); Flemming Bent Rasmussen, Frederiksberg (DK); Alfred Gösta Victor Strand, Malmö (SE)

(73) Assignee: FaunaPhotonics Agriculture & Environmental A/S, Copenhagen SV (DK)

( * ) Notice: Subject to any disclaimer, the term of this patent is extended or adjusted under 35 U.S.C. 154(b) by 0 days.

(21) Appl. No.: 17/904,422

(22) PCT Filed: Feb. 19, 2021

(86) PCT No.: PCT/EP2021/054181
§ 371 (c)(1),
(2) Date: Aug. 17, 2022

(87) PCT Pub. No.: WO2021/165479
PCT Pub. Date: Aug. 26, 2021

(65) Prior Publication Data
US 2023/0106933 A1    Apr. 6, 2023

(30) Foreign Application Priority Data

Feb. 19, 2020   (EP) .................................. 20158120

(51) Int. Cl.
*G06V 10/762*  (2022.01)
*A01K 29/00*   (2006.01)
(Continued)

(52) U.S. Cl.
CPC ............ *A01K 29/00* (2013.01); *G06V 10/762* (2022.01); *G06V 40/10* (2022.01); *H04N 7/181* (2013.01)

(58) Field of Classification Search
None
See application file for complete search history.

(56) References Cited

U.S. PATENT DOCUMENTS

| 5,956,463 A | 9/1999 | Patrick |
| 9,585,376 B2 | 3/2017 | Park |

(Continued)

FOREIGN PATENT DOCUMENTS

| CN | 111028309 A | 4/2020 |
| CN | 111192256 A | 5/2020 |

(Continued)

OTHER PUBLICATIONS

International Search Report and Written Opinion of International Searching Authority for International Patent Application No. PCT/EP2021/054181, mailed Mar. 19, 2021 (12 pages).

(Continued)

*Primary Examiner* — Eileen M Adams
(74) *Attorney, Agent, or Firm* — Ice Miller LLP

(57) ABSTRACT

An apparatus for determining an index of insect biodiversity comprises a plurality of optical insect sensor devices configured to be individually positioned within a geographic area and a data processing system. Each sensor device is configured to monitor insect activity within a detection volume by detecting light from the detection volume, and to output detector data indicative of one or more optically (Continued)

detected attributes associated with respective detected insect detection events. Each insect detection event is indicative of one or more insects being present in the detection volume. The data processing system is configured to receive detector data from respective ones of the plurality of optical insect sensor devices. The detector data is indicative of one or more optically detected attributes associated with respective detected insect detection events. The system computes, from the received detector data, an index of insect biodiversity indicative of insect biodiversity within the geographic area.

23 Claims, 7 Drawing Sheets

(51) Int. Cl.
  *G06V 40/10* (2022.01)
  *H04N 7/18* (2006.01)

(56) References Cited

U.S. PATENT DOCUMENTS

| | | | |
|---|---|---|---|
| 9,635,840 B2* | 5/2017 | Reckhaus | G01N 33/5085 |
| 10,002,416 B2 | 6/2018 | Mannar et al. | |
| 2005/0025357 A1 | 2/2005 | Landwehr | |
| 2009/0153659 A1* | 6/2009 | Landwehr | G06V 20/66 |
| | | | 382/165 |
| 2016/0245916 A1* | 8/2016 | Weber-Grabau | |
| | | | H01J 37/32917 |
| 2018/0007343 A1* | 1/2018 | Send | H04N 13/271 |
| 2019/0034736 A1* | 1/2019 | Bisberg | G06V 20/66 |
| 2019/0082650 A1 | 3/2019 | Lepek et al. | |
| 2020/0113142 A1 | 4/2020 | Coleman et al. | |

FOREIGN PATENT DOCUMENTS

| | | |
|---|---|---|
| CN | 112488244 A | 3/2021 |
| WO | 2004009575 A1 | 1/2004 |
| WO | WO 2017/182440 A1 | 10/2017 |
| WO | 2018019857 A1 | 2/2018 |
| WO | 2019244156 A1 | 12/2019 |
| WO | 2020043841 A1 | 3/2020 |
| WO | 2020043853 A1 | 3/2020 |
| WO | 2021051150 A1 | 3/2021 |
| WO | 2021165479 A1 | 8/2021 |

OTHER PUBLICATIONS

European Patent Office, Extended Search Report for Application No. 20158120.4, dated Aug. 4, 2020 (8 pages).

Monteiro, L. S. et al.; "High Diversity of Drosophilidae in High-Altitude Wet Forests in Northeastern Brazil"; Neotropical Entomology, vol. 45, No. 3, pp. 265-273; Sociedad Entomologica do Brasil, Sao Paolo, Brasil; Mar. 8, 2016; XP035971322; ISSN: 1519-566X; DOI: 10.1007/S13744-016-0364-3 (9 pages).

Kirsch, P. et al.; "Fast-ID: Flight signature recordings of aedes and Culex mosquitoes for automated species identification and vector surveillance"; American Journal of Tropical Medicine and Hygiene; Jan. 2007 (2 pages).

Hallman, C. A. et al.; "More than 75 percent decline over 27 years in total flying insect biomass in protected areas"; PLoS ONE 12 (10): e0185809; Oct. 18, 2017; retrieved from http://doi.org/10.1371/journal.pone.0185809 (21 pages).

OECD (2019); *Biodiversity: Finance and the Economic and Business Case for Action,* report prepared for the G7 Environment Ministers' Meeting, May 5-6, 2019 (96 pages).

Underwood, E. et al.; "Pollinator Initiatives in EU Member States: Success Factors and Gaps", report for European Commission under contract for provision of technical support related to Target 2 of the EU Biodiversity Strategy to 2020—maintaining and restoring ecosystems and their services; ENV.B.2/SER/2016/0018; Institute for European Environmental Policy, Brussels; Dec. 14, 2017 (70 pages).

Runemark, A. et al.; "Rare Events in Remote Dark-Field Spectroscopy: An Ecological Case Study of Insects": IEEE Journal of Selected Topics in Quantum Electronics, vol. 18, No. 5, pp. 1573-1582; Sep./Oct. 2012; 1077-260X (10 pages).

Alem Gebru, et al., "Multiband modulation spectroscopy for the determination of sex and species of mosquitoes in flight," J. Biophotonics, 2018; 11:e201800014, https://doi.org/10.1002/jbio.201800014.

E.Puig, et al., "Assessment of crop insect damage using unmanned aerial systems: A machine learning approach," 21st International Congress on Modelling and Simulation, Gold Coast, Australia Nov. 29 to Dec. 4, 2015; www.mssanz.org.au/modsim2015.

* cited by examiner

METHOD AND APPARATUS FOR DETERMINING AN INDEX OF INSECT BIODIVERSITY, AN INSECT SENSOR AND A SYSTEM OF INSECT SENSORS

CROSS-REFERENCE TO RELATED APPLICATIONS

This application is a U.S. national phase application of International Application No. PCT/EP2021/054181, filed Feb. 19, 2021, which claims the benefit of priority of European Patent Application No. 20158120.4, filed Feb. 19, 2020. This application is related to co-pending U.S. application Ser. No. 18/572,426, filed Dec. 20, 2023, entitled "Apparatus and Method for Measuring Insect Activity," the disclosures of which are incorporated by reference in their entireties.

TECHNICAL FIELD

The present disclosure relates to a method and to an apparatus for determining an index of insect biodiversity. The present disclosure further relates to an insect sensor and a system of insect sensors.

BACKGROUND

Insect decline, in particular loss in insect biodiversity is one of the top challenges facing the world today and considered one of the greatest risks of the 21st century.

A recent OECD report entitled "*Biodiversity: Finance and the Economic and Business Case for Action*, May 2019" states: "Biodiversity loss is one of the greatest risks of the 21st century. It undermines human health and well-being, societal resilience and progress towards the Sustainment and development goals. It places severe costs on our economies and makes addressing other global challenges, such as climate change, much more difficult."

"The planet is facing its sixth mass extinction, with the current rate of species extinction estimated to be as high as 1000 times the background (pre-human) rate. In addition, widespread and rapid population declines are affecting even common species that are fundamental to ecological processes: since 1970, the world has lost 60% of its global vertebrate population, and more than 40% of insect species are declining rapidly".

When addressing problems related to insect decline, the current lack of precise and accurate data is a key problem for research, businesses and decision makers. Therefore, there is an urgent need for precise data that may guide and facilitate proper actions and legislation to ensure sustainable environments and use of chemicals, while allowing sufficient food production to support a growing population. Current methods for studying and monitoring biodiversity and insect behaviour rely on laborious methods where insects are collected with nets and manual traps and subsequent analysed via microscopic and genetic analysis.

It is thus desirable to provide efficient yet precise methods and apparatus for determining an index of insect biodiversity that allows the collection of comprehensive data to support decision-making processes and that provides industry with a tool for balancing production with sustainability. It is further desirable to provide cost-efficient and reliable insect sensors for measuring insect activity.

The number of insects in a geographic area may vary over time but also across a given area. These temporal and spatial variations make accurate determination of reliable and consistent measures of insect activity and, in particular, insect biodiversity challenging. In particular, insects are often non-uniformly distributed across an area and hot spots of locally high insect concentrations may occur. Moreover, the location of such hot spots may change over time.

Yet further, traditional methods for quantifying a biodiversity index rely on accurate identification of insect species, thus rendering traditional methods labour intensive, sensitive to variation in expert knowledge and error prone. This in turn reduces the scalability of traditional methods and may reduce their comparative value when calculated for different geographic areas inhabited by different species and/or classified by different human experts. For example, the Institute for European environmental policy summarized the research situation in Denmark in 2017 as follows: "There is a very small number of wild bee experts in Denmark and a significant lack of knowledge on species abundance, distribution and trends" (see E. G. Evelyn Underwood, Gemma Darwin, "Pollinator Initiatives in EU Member States: Success Factors and Gaps," 2017.) Today, research and monitoring are thus hampered by very expensive and labour-intensive practice when studying insects, typically involving sweep-netting, trapping and identification.

Trapping can be done with various methods depending on the target insect, as each trap type is biased towards different species. The total number of collected insects, N, may be identified by a taxonomist typically using a microscope or DNA sequencing of each individual collected insect.

From this type of taxonomy, insects may be separated into different groups. The number of groups is typically referred to as the richness of the population, R, while the number of insects in each group is referred to as the abundance, $r_i$, of insects within a certain group. From these data a biodiversity index can be constructed in various ways such as, the Shannon biodiversity index, H:

$$H = \sum_{i=1}^{R} r_i \ln(r_i)$$

or the Simpson biodiversity, D $$D = 1 - \frac{\sum_{i=1}^{R} r_i(r_i - 1)}{N(N - 1)}$$

An important point is that the grouping of insects is not a standardised process but rather depends strongly on the context of a specific study. As examples, species delimitation can be according to order (flies), family (hoover files) and even genus type within a family. Also, studies are performed where the biodiversity is defined according the bio services various groups provide to an ecosystem, e.g. pollination.

Using the approach outlined above the ability to obtain highly temporally and spatially resolved data is usually very limited and studies are either done intensively over a short period or at low intensity over a long period. For example, a recent insect decline study (see C. A. Hallmann et al., "More than 75 percent decline over 27 years in total flying insect biomass in protected areas," PLoS One, vol. 12, no. 10, 2017) involved malaise traps being emptied on average every 11 days, after which each insect sample was manually dried and weighed. Simply monitoring the flying biomass is therefore a massive task and hard to repeat across different habitats.

In order to reduce the labour associated with the monitoring of insects, attempts have been made to introduce technical solutions.

For example, U.S. Pat. No. 9,585,376 describes a system of electronic insect monitoring devices (EIMDs). The EIMDs each comprise a lure for attracting at least one target insect species, one or more sensors that generate one or more output signals in response to an insect approaching the lure, and an electronic controller configured to determine if the insect approaching the lure belongs to the at least one target insect species using the one or more output signals. In some embodiments, this prior art system may comprise a plurality of EIMDs configured to communicate over a wireless network shared by the plurality of EIMDs. However, lures typically only attract certain species and are therefore unsuitable for monitoring the biodiversity of the total insect population in a given area.

In a different field, U.S. Pat. No. 5,956,463 describes an automated system for monitoring wildlife auditory data and recording same for subsequent analysis and identification. The system comprises one or more microphones, which may be located at various locations in the field, coupled to a recording apparatus for recording wildlife vocalizations in digital format. The resultant recorded data is pre-processed, segmented, and analyzed by means of a neural network to identify the respective species. In particular classification of the species is used to discriminate wildlife calls and to identify the animal from which a selected call originated. Even though this prior art system minimizes the need for human intervention and subjective interpretation of the recorded sounds, its usability for determining insect biodiversity is limited. Firstly, audio-based instruments are sensitive to audio noise, which may mask sounds generated by insects, thus limiting the detection range of the system and its usability in urban areas, along roads or in the vicinity of other sound sources. Moreover, classification of species based on wildlife calls is not suitable for the majority of insects. Finally, training a neural network classification system that determines species still requires laborious collection and classification of training data.

The value in monitoring biodiversity is significant for both agriculture and ecology and the inventors are not aware of known tools which can provide a standardised measure of flying insect diversity. It is thus generally desirable to provide a method and apparatus suitable for determining insect biodiversity. In particular it is desirable to provide a method for determining insect biodiversity that is scalable, accurate and efficient. It further remains desirable to provide an apparatus that is low complex, durable, reliable and accurate. Yet further, it is desirable to provide an apparatus that is largely non-intrusive, that allows for a substantially unbiased detection of a large variety of types of insects and that only minimally affects the insect activity, as this allows for a more accurate determination of a biodiversity index.

SUMMARY

Disclosed herein are embodiments of a method and an apparatus for determining an index of insect biodiversity as well as embodiments of an insect sensor and of a system of insect sensors.

According to a first aspect, embodiments of an apparatus for determining an index of insect biodiversity comprise:
  a plurality of optical insect sensor devices configured to be individually positioned within a geographic area, each insect sensor device configured to:
    monitor insect activity within a detection volume extending outside the insect sensor device by detecting light from the detection volume, and to
    output detector data indicative of one or more optically detected attributes associated with respective detected insect detection events, each insect detection event being indicative of one or more insects being present in the detection volume;
  a data processing system communicatively coupled to the plurality of optical insect sensor devices and configured to:
    receive detector data from respective ones of the plurality of optical insect sensor devices, the detector data being indicative of one or more optically detected attributes associated with respective detected insect detection events, and to
    compute, from the received detector data, an index of insect biodiversity indicative of insect biodiversity within the geographic area.

As the insect sensor devices optically detect attributes associated with insect detection events in a detection volume outside the insect sensor devices, the apparatus is non-intrusive to the environment in the sense that it does not rely on and, consequently, is not biased by pheromones or other means of attracting, trapping or killing insects. In particular, insects may be detected in their natural environment regardless of their affinity to a certain lure or trap technology, thus reducing the sensitivity of the measurement results to different trapping techniques for different insect species. To this end, the detection volume is preferably an enclosure-free void/space allowing unrestricted movement of living airborne insects into and out of the void/space.

According to a second aspect, embodiments of an apparatus for determining an index of insect biodiversity comprise:
  one or more optical insect sensor devices configured to be individually positioned within a geographic area, each of the one or more insect sensor devices configured to:
    monitor insect activity within a detection volume to detect one or more insect detection events, each insect detection event being indicative of one or more insects being present in the detection volume; and to
    output detector data indicative of one or more optically detected attributes associated with respective detected insect detection events,
  a data processing system communicatively coupled to the one or more optical insect sensor devices and configured to:
    receive detector data from the one or more optical insect sensor devices, the detector data being indicative of one or more optically detected attributes associated with respective detected insect detection events, wherein the detected insect detection events are taxonomically unclassified, and to
    compute an index of insect biodiversity directly from the optically detected attributes associated with the taxonomically unclassified detection events.

Accordingly, the data processing system is configured to compute the biodiversity index directly from the optically detected attributes, i.e. without an intermediate taxonomical classification of the individual detected insects, i.e. without mapping the detected insects to known groups of insects, e.g. to known families or species. In other words, the step of insect taxonomic classification is avoided and the biodiversity index is calculated directly from the collected data samples instead. Embodiments of the apparatus may thus automatically collect and process detector data in a standardized way, thereby increasing comparability of the results across different geographic areas. Moreover, the process reduces the influence of misclassifications, e.g. due to human errors, on the resulting index of insect biodiversity. Yet further, the apparatus is capable of computing an index of insect biodiversity even in cases where the insect species of the population are not known or where the optically detectable attributes have not previously been classified to known groups of insects.

Generally, embodiments of the apparatus according to one or both of the above aspects allow a more uniform detection of a large variety of insects, regardless of the specific insect species. Hence, embodiments of the apparatus provide a computation of a more accurate measure of insect biodiversity. As the apparatus automatically computes the index of insect biodiversity from the acquired detector data, the apparatus is less sensitive to researcher bias or variation in classification technique.

Embodiments of the apparatus described herein can provide a standardised measure of insect biodiversity to allow comparison of biodiversity over time and between different geographic locations. Embodiments of the apparatus may be operated in a fully automated manner, thus facilitating assessment of insect biodiversity in real time, day by day, hour by hour and even minute by minute.

The computation of the index of insect biodiversity directly from the detector data may be done in a number of ways.

In particular, computing the index of insect biodiversity may comprise computing the index of insect biodiversity from the optically detected attributes, which are associated with respective ones of a set of detected insect detection events. In some embodiments, each element of the set of detected insect detection events may be associated with a plurality of attributes of different types, e.g. a wing beat frequency and a melanisation ratio and/or other attributes associated with the insect detection event. For example, each insect detection event may have associated with it an n-tuple. Each n-tuple represents n attributes associated with the corresponding insect detection event. The process may use different numbers of attributes, i.e. n may be an integer larger or equal than 1, e.g. n may be equal to 1, 2, 3, 4 or larger. For example, in one embodiment n=2 and each n-tupel includes a wing beat frequency and a body-wing ratio. The set of detected insect detection events from which the index of biodiversity is calculated includes a plurality of insect detection events, such as at least 50 insect detection events, e.g. at least 100 insect detection events, such as at least 500 insect detection events.

In some embodiments, computing the index of insect biodiversity comprises computing the index of insect biodiversity as a measure of variability of the optically detected attributes associated with respective ones of the set of detected insect detection events. In particular, the data processing system may compute the measure of variability by performing a statistical analysis of the optically detected attributes associated with the set of detected insect detection events, in particular a multi-variate analysis. For example, the data processing system may compute one or more measures that represent the diversity of the set of n-tuples. Example measures of variability include but are not limited to a covariance trace (total variance), a covariance entropy, a covariance determinant and a summed standard deviation, or a combination thereof.

In some embodiments, computing the measure of variability includes performing a clustering of the detected insect detection events according to at least the optically detected attributes associated with the respective detected insect detection events. The clustering may result in a set of clusters, each cluster including one or more of the detected insect detection events. Example clustering approaches include DBSCAN and Gaussian Mixture Models. Useful outputs of clustering-based approaches include but are not limited to the number of clusters, required parameters to achieve a given number of clusters or features of the Akaike or Bayesian information criterion.

There are a number of ways the process may compute an index of insect biodiversity from an output of an unsupervised clustering process. For example, the index of insect biodiversity may be computed from the number of resulting clusters, by computing a Shannon or Simpson index from the resulting clusters, by applying a Gaussian mixture method, by applying a Gaussian mixture AIC gradient approach, etc., or a combination thereof.

Using for example the DBSCAN clustering process, the number of clusters found is one of the output parameters of the clustering process. This number of clusters can be used as a biodiversity index as a number reminiscent of species richness (i.e. the number of different species present in an area).

Other clustering models, such as Gaussian Mixture Models, require the number of clusters to be pre-defined before training, and therefore do not a priori provide a richness-like measure. One approach here is to pre-define a range of possible clusters (e.g. between 1 and 100 with a step of 1) and then fit the model for each cluster number. The goodness-of-fit of these models can be described by an external function for example the Bayesian Information Criterion or the Akaike Information Criterion. Thus, a similar 'best' number of clusters can be determined by identifying the minimum point in the generated distribution of goodness-of-fit values.

The Shannon and Simpson indices are methods used to quantify the diversity of a population which can be divided into discrete groups. In conventional ecology these groups are generally aligned with taxonomic levels, such as species, genus or family. However, in an unsupervised approach to biodiversity quantification, the optimum number of clusters—e.g. determined as discussed above—may be used. In this case, the input parameters to the Shannon and Simpson indices would be the number of clusters, and the number of individuals sorted into each cluster.

The BIC and AIC are not infallible methods, and sometimes do not produce a single, or reliable, minimum value. However, in the case of the BIC the distribution at some point always crosses the x axis at a value which changes with the number of ideal clusters. The more clusters present in the data, the higher the distribution crosses the x axis. This approach always results in a single value (the x axis is only crossed once) and the value is much higher than the predicted number of clusters which allows for some additional nuance. This approach has been found by the inventors to produce values which correlate well with the ground truth data with a correlation coefficient of $R2=0.90$.

The AIC gradient approach is an attempt to improve on the Akaike Information Criterion approach to assessing the optimal number of clusters. The AIC function, when applied to a dataset descriptive of insect detection events, often takes the form of an oblique elbow, where the criterion drops sharply as the number of clusters increases, and then at some inflection point the gradient sharply decreases and the criterion continues to decline. This means that there is no defined minimum point. The gradient of the AIC appears to correlate with the point that the elbow inflection lay, so this approach quantifies the gradient of the initial linear decline.

Other examples of methods for computing a measure of variability of the optically detected attributes associated with respective insect detection events include a statistical description of raw events using auto-encoding or similar techniques and dimensional reduction of the optically detected attributes.

In some embodiments, the computation of the index of insect biodiversity is based on a mathematical model that directly maps the optically detected attributes associated with respective detected insect detection events to an index of insect biodiversity. In particular, the mathematical model may be a machine learning model such as a supervised machine learning model. For example, when applying a supervised machine learning model, the data processing system is configured to implement a trained machine learning model, in particular a model trained by supervised learning. The supervised learning may involve applying a training set to train a machine learning model to predict the biodiversity of an input either as a number such as an existing or novel index, or into one or more categories. The training data may comprise detector data from one or more insect sensor devices and known biodiversity measurements from either field trials or simulated data. Examples of machine learning models include a convolutional or fully-connected neural network, a decision tree, or the like.

Generally, the index of insect biodiversity refers to a suitable numerical measure of insect biodiversity, in particular airborne insects such as flying or jumping insects. For the purpose of the present description an index of insect biodiversity will also be referred to as insect biodiversity index or merely biodiversity index. The index of insect biodiversity mat be represented as a number, e.g. a number between 0 and 1, or in another suitable way, e.g. as a categorization into biodiversity classes, e.g. "low', "medium", "high", etc. In some embodiments, the computation of the index of insect biodiversity may comprise correlating the optically detected attributes associated with a set of detected insect detection events to a known biodiversity metrics such as, but not limited to, the Simpsons or the Shannon biodiversity index.

Each insect sensor device may be mounted at a stationary detection site or non-stationary, e.g. mounted on a vehicle. The vehicle may be a ground vehicle, i.e. a vehicle that operates while in contact with the ground surface. A ground vehicle may e.g. drive on wheels or the like. For example, the ground vehicle may be a tractor or other farming vehicle. Other examples of vehicles include aerial vehicles such as an airplane, a helicopter or the like. The vehicle may be a manned vehicle or an unmanned vehicle.

Each insect sensor device may comprise an illumination module configured to illuminate the detection volume, in particular the entire detection volume. Each insect sensor device may comprise a detector module comprising one or more detectors configured to detect light from the detection volume, in particular from the entire detection volume. The detector module may thus output a sensor signal indicative of the detected light, e.g. indicative of a detected light intensity as a function of time.

In some embodiments, each insect sensor device comprises an illumination module and a detector module.

The apparatus may comprise one or more processing units configured to receive a sensor signal from a detector module of at least one of the insect sensor modules and to process the received sensor signal so as to detect one or more insect detection events and to extract one or more optically detectable attributes associated with the detected insect detection events. The processing unit may be implemented as a local processing unit, integrated into an insect sensor device and configured to process sensor signals of the detector module of said insect sensor device into which the processing unit is integrated. In other embodiments, some or all of the processing steps are performed by a processing unit external to the insect sensor device, i.e. the processing unit may be implemented in a device external to the insect sensor device or it may be distributed between a local processing unit of the insect sensor device and a remote processing unit, separate from the insect sensor device In some embodiments, the illumination module comprises a light source that is configured to emit incoherent light. Suitable light sources include light-emitting diodes (LEDs) and halogen lamps, as these are able to simultaneously illuminate a large detection volume with sufficient light intensity. Further, incoherent light sources are useful to provide a homogeneous, speckle free, illumination of the detection volume, in particular a simultaneous illumination of a large detection volume without the need for any scanning operation. This reduces the complexity of the optical system and allows reliable detection of wing beat frequencies and/or trajectories even of fast-moving insects.

Nevertheless, other light sources, including coherent light sources, such as lasers, may be used instead. In some embodiments, the light source is configured to output light continuously while, in other embodiments, the light is turned on and off intermittently, e.g. pulsed.

In some embodiments, the illumination module is configured to emit light with varying intensity, in particular pulsed or otherwise modulated at one or more modulation frequencies.

Some embodiments of the apparatus include one or more insect sensor devices disclosed in the following, in particular one or more embodiments of the insect sensor device according to the third aspect described below and/or a system of insect sensor devices according to the fourth aspect described below.

According to a third aspect, disclosed herein are embodiments of an optical insect sensor device for detecting insects in a detection volume, the insect sensor device comprising:
an illumination module configured to illuminate the detection volume with illumination light comprising light at a first wavelength band modulated at a first modulation frequency and light at a second wavelength band;
a detector module comprising a detector configured to detect light from the detection volume;
a processing unit configured to receive sensor signals from the detector module and configured to filter the received sensor signal to extract a first sensor signal modulated at the first modulation frequency and, based on at least the first sensor signal, to detect at least one insect in the detection volume and to determine at least one optically detectable attribute of the detected insect, such as a melanisation ratio and/or a direction of movement.

Embodiments of the insect sensor device provide accurate measurements while maintaining a low optical complexity of the insect sensor device. Embodiments of the insect sensor device allow accurate measurements of spectral reflectivity at one, two or more wavelengths, largely unaffected by background illumination such as sunlight, while still allowing a high temporal fill factor in one, two or more channels. Accordingly, embodiments of the insect sensor device are particularly useful for measuring insect biodiversity or for performing other insect measurement tasks, as multiple relatively low-cost sensors can be deployed and operated in a large variety of environmental conditions, thus allowing data to be collected from a large total detection volume.

The insect sensor device may be mounted at a stationary detection site or non-stationary, e.g. mounted on a vehicle, e.g. as described above.

The illumination module may be configured to illuminate the detection volume with illumination light and the detector module may be configured to detect a backscattered portion of the illumination light, the backscattered portion being backscattered by insects moving about the detection volume. The inventors have found that a reliable detection and/or identification of insects can be performed by detecting and analyzing light, in particular backscattered light, from illuminated insects. In particular, the detector module may be configured to record a temporal profile of the reflected/backscattered light, as the temporal profile of the reflected/backscattered light is a fingerprint of the insect which can be used to distinguish between different types of insects.

The detection volume is a 3D volume from which the insect sensor device obtains sensor input suitable for the detection of insects. The detection volume may thus completely or partly be defined by the field of view and depth of field of the detector module. In embodiments where the detection volume is illuminated by an illumination module, the detection volume may be defined as an overlap of the volume illuminated by the illumination module and by a volume defined by the field of view and depth of field of the detector module.

The detection volume may have a predetermined shape, size and position relative to the illumination module and/or relative to the detector module, e.g. relative to an aperture and/or an optical axis of the detector module. In particular, the detection volume may, during the entire detection process, be stationary relative to the detector module and to the illumination module. Accordingly the detector module may comprise one or more lenses that define an optical axis of the detector module and and/or that define a focal length. The focal length may be fixed during the entire detection process. Moreover, the optical axis may be fixed, during the entire detection process, e.g. relative to the illumination module and/or relative to a housing of the insect sensor device. However, it will be appreciated that the insect sensor device may allow the size, shape and/or relative position of the detection volume to be pre-configured and adapted to a specific measurement environment, e.g. by changing a relative position and/or orientation of the illumination module and the detector module. The detector module may further comprise an aperture.

The detection volume may have a variety of shapes and sizes, such as box-shaped, cylindrical, ball-shaped, cone-shaped, pyramidal, frusto-conical, frusto-pyramidal, etc. In some embodiments, the detection volume has a size of at least 10 l, such as at least 20 l, such as at least 0.2 m$^3$, such as at least 0.5 m$^3$, such as at least 1 m$^3$, such as at least 2 m$^3$, such as at least 3 m$^3$. Even when each individual insect sensor device has a relatively small detection volume, e.g. less than 100 l, a system of several individual insect sensor devices may be deployed so as to provide a larger total detection volume in which insect activity can be monitored by the system of such insect sensor devices.

In some embodiments, the detection volume has a size of less than 20 m$^3$, such as less than 10 m$^3$, such as at least than 5 m$^3$, such as less than 1 m$^3$, such as less than 100 l, thereby facilitating uniform illumination at high brightness of the entire detection volume while allowing for reliable detection of e.g. trajectories and/or wing beat frequencies of insects.

In some embodiments, the detection volume has an aspect ratio, e.g. defined as a ratio of a largest edge to a smallest edge of a minimum bounding box of the detection volume. In some embodiments, the aspect ratio is no larger than 10:1, such as no larger than 5:1, such as no larger than 3:1, such as no larger than 2:1. For example, the aspect ratio may be between 1:1 and 10:1, such as between 1:1 and 5:1, such as between 1:1 and 3:1, such as between 2:1 and 3:1. A low aspect ratio of the detection volume allows moving insects to be tracked over a relative long period of time, regardless of the direction of travel of the insects, thus allowing more accurate detection of different insects, e.g. flying or jumping insects, insects moving at different speeds, etc. Moreover, a relatively long observation time also increases the accuracy of the determined optically detectable attributes such as wing beat frequency, etc. The minimum bounding box may have a vertical and two horizontal edges. The vertical edge may be the smallest edge of the minimum bounding box. For example, a ratio between each of the horizontal edges and the vertical edge may be between 2:1 and 10:1, such as between 2:1 and 5:1, such as between 2:1 and 3:1.

Each insect sensor device may be configured to be deployed in a geographic area such that the detection volume may be elevated above the ground surface by a minimum vertical offset. To this end, the insect sensor device may include or otherwise be configured to be mounted on a stationary or movable support structure. In some embodiments, the insect sensor device and/or the support structure is/are configured such that the detection volume extends from a top of a vegetation canopy upwards. Accordingly, interference of the vegetation with the insect sensor device, e.g. by blocking the light path, is thus avoided or at least reduced. To this end, the minimum vertical offset may be predetermined, e.g. configurable prior to use. To this end, the support structure may be adjustable so as to adjust a mounting height of the insect sensor device, so as to adapt the minimum vertical offset to the vegetation in vicinity of the insect sensor device. For example, the insect sensor device may be mounted such that the vertical offset of the insect sensor device above the ground surface is adjustable and/or such that the orientation of the insect sensor device relative to the ground surface is adjustable. The size of the vertical offset may depend on the height of the vegetation growing in the area of land where the insect sensor device is deployed. The vertical offset may be chosen to be larger than a height of the vegetation, e.g. larger than a maximum height of population of plants making up the vegetation in the area of land where the insect sensor device is deployed, or larger than a median height of population of plants in the area of land where the insect sensor device is deployed. For example, the minimum vertical offset may be chosen between 10 cm and 5 m, such as between 20 cm and 3 m, such as between 20 cm and 2 m, such as between 50 cm and 2 m. In some embodiments, when a system or apparatus comprises a plurality of insect sensor devices, the vertical offset may be chosen to be substantially the same for all insect sensor devices of the system or apparatus.

In some embodiments, the detection volume is located in a proximity of the insect sensor device. In particular, the detection volume may extend between a proximal end and a distal end of the detection volume, relative to the insect sensor device, e.g. relative to an aperture or other optical input port of the detector module. In some embodiments, the distal end may be no more than 5 m from the insect sensor device, such as no more than 4 m, such as no more than 3 m. The proximal end may be separated from the insect sensor device, e.g. from an aperture or other optical input port of the detector module, by 1 cm or more, such as by 10 cm or more, such as by 20 cm or more, such as by 30 cm or more.

Embodiments of the insect sensor device described herein are particularly suitable for detecting airborne insects, such as flying or jumping insects. Embodiments of the insect sensor device described herein allow for detection of insects moving within the detection volume during sufficiently long observation times so as to reliably identify and distinguish different optically detectable attributes, e.g. wing beat frequencies and/or a trajectories and/or body wing ratios and/or melanisation ratios. Such techniques have been found to allow reliable computation of an index of insect biodiversity when individual insects remain in the detection volume sufficiently long.

Using a wide volume (in particular a volume having a large cross-sectional area when viewed along an optical axis of the detector module) close to the insect sensor device rather than e.g. a narrow beam extending far away from the insect sensor device provides a number of advantages:

- Optical alignment is less sensitive, allowing the insect sensor device to operate for extended periods of time without continuous calibration.
- Lower light intensity is required, which makes the insect sensor device eye safe and therefore capable of unsupervised operation in the field.
- As the received intensity from an insect decreases with distance, a better size estimation can be done based on the amplitude of the received signal.
- Only a low spatial resolution is needed (fewer "pixels") to adequately focus the illuminated volume onto an image sensor. While long-range instruments depend on pulsed light and use very expensive and sensitive photo multiplier tubes to collect the light, or for the geometrical Scheimpflug configurations CMOS line arrays with thousands of pixels, embodiments of the insect sensor described herein are capable of collecting the light on few, e.g. four, photodiodes where each diode sub-samples the beam. This in turn allows use of very high sampling frequencies. The high sampling frequency (MHz range) allows the use of lock-in amplification which enables the ability to record two wavelengths on one diode and/or to suppress background illumination. This reduces the optical complexity of the insect sensor device and allows accurate measurements of spectral reflectivity at one, two or more wavelengths, unaffected by background illumination such as sunlight, while still allowing a high temporal fill factor in two (or more) channels.
- Insect movement in the volume may be monitored in multiple, e.g. 4, sensors with non-overlapping field of view. This means that it is possible to monitor flight direction and speed.
- A wider beam yields longer transit times and insect events which improves data quality.

In some embodiments, the illumination module comprises a light source that is configured to emit coherent or incoherent visible light and/or infrared and/or near-infrared light and/or light in one or more other wavelength bands. Infrared and/or near-infrared light (such as light in the wavelength band between 700 nm and 1500 nm, such as between 700 nm and 1000 nm) is not detectable by many insects, and thus does not influence the insect's behavior.

In some embodiments, the illumination module is configured to selectively illuminate the detection volume with light of two or more wavelength bands, in particular two or more mutually spaced-apart wavelength bands. In some embodiments, the illumination module is configured to emit an illumination beam that includes a homogenous mix of light consisting of two or more wavelength bands (e.g. at 808 and 970 nm, respectively). To this end, the illumination module may include a first light source, e.g. comprising one or more LEDs, configured to selectively emit light of a first wavelength band. The illumination module may further include a second light source, e.g. comprising one or more LEDs, configured to selectively emit light of a second wavelength band, which may be spaced-apart from the first wavelength band. The illumination module may further include one or more further light sources, e.g. comprising one or more LEDs, configured to selectively emit light of one or more further second wavelength bands, which may be spaced-apart from the first wavelength band and/or second wavelength band. The detector module may be configured to selectively detect the selected wavelength bands. In one embodiment, the illumination module is configured to emit light at a first wavelength band at 808 nm+/−25 nm and light at a second wavelength band at 970 nm+/−25 nm. Such a multi-spectral illumination system facilitates color detection of moving insects.

Using more than one wavelength introduces the possibility to measure "colour", or melanin content of targets. Melanin absorption decreases with increasing wavelengths. By using two, or more, channels at well-separated wavelengths, and comparing the ratio of the received intensity at these two wavelengths, the melanin content can be estimated. For example, a possible measure indicative of the melanisation ratio may be expressed as the ratio $I_{\lambda 1}/(I_{\lambda 1}+I_{\lambda 2})$ or another measure of the relative detected intensity (denoted $I_{\lambda 1}$ and $I_{\lambda 2}$, respectively) at two wavelength bands around wavelengths $\lambda_1$ and $\lambda_2$, respectively. In one embodiment $\lambda_1 = 808$ nm and $\lambda_2 = 970$ nm.

In some embodiments, the apparatus further separates the body and wing contribution of the recorded signal. Accordingly, the apparatus may determine both body and wing melanisation in the insect. It also allows the apparatus to more accurately estimate other features such as wingbeat frequency, since the apparatus can treat the signal received in each wavelength independently and get two separate measurements on the wingbeat frequency. If they for some reason do not agree, that insect detection event can e.g. be discarded as noise.

In some embodiments, the illumination module is configured to illuminate the detection volume with illumination light at the first wavelength band modulated at the first modulation frequency and light at a second wavelength band, different from the first wavelength band, modulated at a second modulation frequency, different from the first modulation frequency. In one embodiment the light at the first wavelength band (e.g. at 808 nm) is modulated at about 80 kHz and the light at the second wavelength band (e.g. at 980 nm) is modulated at about 120 kHz. The detector module may thus be configured to detect light signals from the detection volume and to selectively filter the detected light signals with the first and second frequencies, respectively. In particular, the processing unit of the insect sensor device may be configured to filter the received sensor signal to extract the first sensor signal modulated at the first modulation frequency and a second sensor signal modulated at the second modulation frequency and, based on the first and second sensor signals, to detect at least one insect in the detection volume and to determine at least one optically detectable attribute of the detected insect, such as a melanisation ratio and/or a direction of movement.

Accordingly, the detector module may selectively detect the respective wavelength bands with a single detector and efficiently suppress background light, such as daylight or light from light sources other than the illumination module. It will be appreciated that alternative embodiments will include more than two wavelength bands, e.g. 3 or 4 or 5 or more wavelength bands, and the more than two wavelength bands may be modulated at respective modulation frequencies. The processing unit may thus be configured to filter the received sensor signal to extract a corresponding plurality of two or more than two sensor signals modulated at the respective modulation frequencies and, based on the more than two sensor signals, to detect at least one insect in the detection volume and to determine at least one optically detectable attribute of the detected insect.

In one embodiment, the selective filtering of the one or more modulation bands can be done efficiently using phase sensitivity lock-in detection which further eliminates noise from other light sources.

A convenient illumination of a relatively large detection volume, in particular a simultaneous illumination of the entire detection volume, with a compact illumination module, may e.g. be provided when the illumination module is configured to emit a diverging beam of light, in particular a beam of light having a divergence angle in at least one direction of between 2° and 45°, such as between 10° and 30°, or between 35° and 45°, measured as a full angle between rays originating from the light source and intersecting opposite ends of a beam diameter.

The illumination module may e.g. include one or more optical elements, such as one or more reflectors and/or one or more lenses that direct the light from the light source as a beam of light, such as a diverging beam of light, of a suitable cross-sectional shape towards the detection volume. For example, the beam of light may have a rectangular or round, e.g. oval or circular, cross section. Accordingly, the detection volume may have a frusto-conical or frusto-pyramidal shape.

When detecting moving insects in a field of vegetation, it has turned out that a frusto-conical or frusto-pyramidal detection volume having an elongated (e.g. elliptical or rectangular) base/cross section is particularly advantageous. The base/cross section may be a cross section orthogonal to an optical axis of the detector unit or of the illumination unit. In some embodiments, the elongated cross-section/base has a width (measured in a horizontal direction) that is larger than a height (measured in a vertical direction), e.g. such that the ratio between the width and the height is at least 3:2, such as at least 2:1, e.g. between 3:2 and 5:1, such as between 3:2 and 3:1, such as between 2:1 and 3:1. A detection volume having an elongated cross section with a horizontal longitudinal axis where the detection volume is elevated above the ground surface by a minimum vertical offset allows the detection volume to be arranged as a relatively flat volume, e.g. a flat box-shaped volume or a volume generally shaped as a flat pie slice, that may be horizontally arranged above a canopy of vegetation. Such a volume reduces reflections, stray light or other disturbing effects of the plants that might otherwise interfere with the detection process. Also, such a detection volume makes efficient use of the available illumination power to illuminate a volume where most insect activity occurs.

At least in some embodiments, the detection volume is a three-dimensional detection volume extending outside the insect sensor device. In particular, the detection volume is an enclosure-free void allowing unrestricted movement of living airborne insects into and out of the void. To this end, the detection volume may be defined solely by the overlap of the illumination volume and the field of view and depth of field of the detector module. When the detection volume is defined by an overlap between the illumination volume and the field of view and depth of field of the detector module, the illumination module may be configured to illuminate a conical or pyramidal or frusto-conical or frusto-pyramidal illumination volume, in particular with an elongated base/cross-section as described above with reference to the detection volume.

In some embodiments, the detector module comprises an imaging system, such as a camera. The imaging system includes an optical lens configured to image an image plane onto an image sensor, e.g. a quadrant Silicon detector or an image sensor having a lower or higher resolution. In some embodiments, the image plane is located between 1 m and 5 m, such as between 1 m and 4 m, such as between 1.5 m and 3 m in front of the optical lens. The imaging system is arranged such that the field of view of the imaging system overlaps, or even substantially coincides, with the illuminated volume at least at said image plane.

The imaging system may have a field of view and a depth of field large enough to record images of the entire detection volume, in particular sufficiently focused images to allow detection of the optically detectable attributes used for calculating the index of insect biodiversity. The imaging system may be configured to detect disturbing events, e.g. larger animals or plants crossing the detection volume. The imaging system may also serve as a detector for detecting background radiation. In some embodiments, the sensor signals recorded by the image sensor may be used by the apparatus to detect insects and/or for detecting airborne trajectories of the insects, detecting wing beat frequencies and/or other attributes. The airborne trajectories are also examples of optically detected attributes that may serve as input to the computation of the index of insect biodiversity and/or another quantity associated with insect activity.

In some embodiments, the one or more detectors, e.g. the image sensor, comprise one or more photo diodes. Individual photodiodes that receive light from the entire detection volume or from a part of the detection volume allow for a fast time-resolved detection of changes in the intensity of backscattered light. Such signals may be used to determine wing beat frequencies of flying insects which, in turn, may be used to detect the presence of insects and, optionally, to distinguish between different types of insects based on properties of the wing beat patterns, e.g. the relative amplitudes of multiple frequencies in a frequency spectrum associated with a detected insect event.

In some embodiments, the detector module comprises an array of photodiodes, the photodiodes configured to receive light from respective parts of the detection volume, e.g. a linear or other 1D array or a 2D array, or another form of 2D image sensor that allows a spatially resolved detection of light impinging on different areas of an image plane. The detector module may be configured to direct light from different sub-volumes of the detection volume onto respective photo-diodes of the array or onto respective areas of a 2D image sensor, thus allowing a space-resolved detection of insects. In some embodiments, the array of photosensitive elements comprises no more than 128 photodiodes, such as no more than 64, such as no more than 25, such as no more than 16, such as no more than 9, such as no more than 4 photodiodes.

In some embodiments, the detector module is configured to selectively detect light at one or more predetermined wavelengths or one or more small wavelength bands. In some embodiments, the detector module is configured to selectively detect light at two or more wavelengths or small wavelength bands where the two or more wavelengths or wavelength bands are spaced apart from each other and do not overlap each other. To this end, the detector module may comprise one or more light-sensitive sensors—e.g. one or more photodiodes, photodiode arrays or other image sensors—configured to selectively detect light at two or more wavelengths or small wavelength bands where the two or more wavelengths or wavelength bands are spaced apart from each other and do not overlap each other. This may e.g. be achieved by a light-sensitive sensor where respective bandpass filters are selectively and alternatingly positioned in front of respective light-sensitive areas of the sensor. Alternatively, the detector module may include two or more separate light-sensitive sensors, each configured to detect light at a respective wavelength or wavelength band. Yet alternatively or additionally, the detector module may be configured to electronically separate sensor signals from light at the respective wavelength bands, e.g. by employing and filtering modulated light as described herein.

In particular, a detector module configured to selectively detect light at 808 nm and at 970 nm, respectively, has been found to be suitable for detecting and distinguishing different type of insects, e.g. based on a ratio of backscattered light at the respective wavelength. In some embodiments, the detector module comprises at least a first light-sensitive sensor configured to selectively detect light within a first wavelength band; and at least a second light-sensitive sensor to selectively detect light within a second wavelength band, non-overlapping with the first wavelength band.

Alternatively, the detector module comprises a light sensitive sensor configured to selectively detect light within a first wavelength band and within a second wavelength band, non-overlapping with the first wavelength band. In the latter embodiment, the detector module may include a modulation filter in order to separately register received light in the first and second wavelength bands and modulated at first and second modulation frequencies, respectively. Generally, the detector module may include a single detector or multiple detectors.

The detector module may be configured to obtain signals at a sampling rate of at least 1 MHz. A high sampling frequency (e.g. in the MHz range) facilitates the use of lock-in amplification which enables the ability to record two wavelengths on one diode and/or the suppression of background radiation.

Besides making it possible to distinguish signals at two wavelengths by a single detector, the modulation filter further ensures that only light with the right frequency and, optionally, the right phase can be detected by the detector module. This in turn ensures that the detector module is insensitive to light from other light sources such as the sun or other artificial sources. An efficient suppression of other light sources further ensures that detector data acquired at different locations and at different times are comparable and allow computation of a standardized biodiversity index.

In one preferred embodiment, the sensor signals are modulation filtered by means of a lock-in amplifier or by means of another suitable electronic modulation filter for extracting signals modulated at a target modulation frequency. When the illumination light at different wavelength bands is also modulated at different modulation frequencies, the detector module can separate sensor signals relating to different wavelength bands into separate channels based on the modulation filtering.

The processing unit may be configured to process the received sensor signals so as to detect one or more insect detection events and to extract one or more optically detectable attributes associated with the detected insect detection events. The processing may include one or more of the following: amplification, A/D conversion, filtering, calibration, feature detection, frequency analysis, calculation of attributes and/or the like.

In particular, the processing unit may process the sensor signal so as to detect one or more signal features indicative of the presence of one or more insects in the detection volume and extract from the sensor signal one or more optically detectable attributes associated with the detected insect detection events. The processing unit may further be configured to count the number of detected insect detection events, e.g. within a predetermined time period, a sliding window or the like, so as to determine an estimate of an amount of insects detected in the detection volume, e.g. as a number of insects detected in the detection volume, e.g. per unit time and/or per unit volume.

Accordingly, the processing unit may output processed detector data representing the respective insect detection events and the detected attributes.

In some embodiments, some or all of the processing steps are performed by a processing unit external to the insect sensor device, i.e. the processing steps may be implemented in a device external to the insect sensor device or they may be distributed between a local processing unit of the insect sensor device and a remote processing unit, separate from the insect sensor device.

For example, in such embodiments, the local processing unit of the insect sensor may output sensor data representing the detected sensor signals, optionally suitably pre-processed, and the external processing unit may further process the sensor signals so as to extract the optically detectable attributes. The external processing unit may be separate from a data processing system that performs the computation of the index of insect biodiversity and/or of another quantity associated with insect activity, or it may be integrated therein.

In some embodiments, the processing unit is configured to extract one or more optically detectable attributes associated with the detected insect detection events. The optically detected attributes may include one or more optically detectable attributes that can be determined from the sensor signals acquired by the optical insect sensor device. Examples of optically detectable attributes include: one or more wing beat frequencies, a body-to-wing ratio, a melanisation ratio (colour), a detected trajectory of movement of an insect inside the detection volume, a detected speed of movement of an insect inside the detection volume, an insect glossiness, or the like. In some embodiments, the optically detected attributes include a representation of light intensities associated with the insect detection event. The representation of light intensities may include a time-resolved and/or frequency-resolved representation, one or more features of a time-resolved and/or frequency-resolved representation, a processed version of a recorded time-resolved and/or frequency-resolved representation, and/or the like. For example, the representation may include time-resolved intensities at one or respective wavelength bands. Suitable features of a representation may include one or more locations of maxima and/or minima of the representation, one or more maximum or minimum values of the light intensity, locations, sizes and/or widths of one or more detected peaks in the representation and/or other detectable features. Examples of a processed version of a recorded time-resolved and/or frequency-resolved representation include a compressed version, an encoded version, an auto-encoded version and/or a dimensionally reduced version of the recorded time-resolved and/or frequency-resolved representation. In some embodiments, the computation of the index of insect biodiversity and/or of another quantity associated with insect activity is based on a combination of two or more optically detectable attributes. The detector data from each insect sensor may be indicative of an amount, e.g. a number, of detected insects detected in the detection volume during a sampling period. The detector data may include one or more optically detected attributes associated with each detected insect detection event and/or another suitable representation of the detected attributes, e.g. a distribution of attributes detected during a sampling period. It will be appreciated that, in some embodiments, the detector data may include unprocessed or only partially processed data, e.g. time-resolved detected light intensities or spectra from which one or more optically detectable attributes may be extracted or which itself may serve as optically detected attributes.

The detection and/or identification of insects based on wing beat frequencies, melanisation ratios and insect glossiness is described in more detail in WO 2017/182440 and in Gebru et. Al: "Multiband modulation spectroscopy for the determination of sex and species of mosquitoes in flight", J. Biophotonics. 2018. While the above documents describe these indicators in the context of a LIDAR system using the Scheimflug principle and in the context of classification of insects, the present inventors have realized that attributes extracted by these techniques may also be applied to insect sensor devices based on other light sources that illuminate an extended volume rather than a narrow laser beam and to the computation of a biodiversity index instead of a taxonomic classification of insects. For example, WO 2017/182440 discloses a laser-based LIDAR system for detecting aerial fauna. Such a LIDAR system for aerial fauna utilizes a collimated laser beam that is transmitted relatively far into the atmosphere, and a receiver/detector measures the backscattered laser light from insects. While such an instrument is able to collect a large number of recordings, LIDAR systems are generally alignment sensitive and they require high-power lasers in order to provide a sufficiently long-range laser beam of sufficient intensity. Accordingly, such a system requires careful installation and operation of a high-power laser typically requires supervision and is normally not suitable for operation in e.g. urban areas.

Here and in the following, the term processing unit is intended to comprise any circuit and/or device suitably adapted to perform the functions described herein. In particular, the term processing unit comprises a general- or special-purpose programmable microprocessing unit, such as a central processing unit (CPU) of a computer or of another data processing system, a digital signal processing unit (DSP), an application specific integrated circuits (ASIC), a programmable logic arrays (PLA), a field programmable gate array (FPGA), a special purpose electronic circuit, etc., or a combination thereof.

In some embodiments the insect sensor device comprises or is communicatively coupled to one or more environmental sensor devices for sensing environmental data, such as weather data. Examples of environmental data include ambient temperature, humidity, amount of precipitation, wind speed, etc. The one or more environmental sensor devices may be included in the same housing as the optical sensor or it may be provided as a separate unit, e.g. a weather station, that may be communicatively coupled to an insect sensor device and/or to a remote data processing device. In some embodiments, a system of insect sensor devices may include one or more environmental sensor devices.

According to a fourth aspect, disclosed herein are embodiments of a system of insect sensors, the system comprising a plurality of optical insect sensor devices configured to be individually positioned within a geographic area, each insect sensor device configured to:
  monitor insect activity within a three-dimensional detection volume extending outside the insect sensor device by detecting light from the detection volume, wherein the detection volume is an enclosure-free void allowing unrestricted movement of living airborne insects into and out of the void; and to
  output detector data indicative of one or more optically detected attributes associated with respective detected insect detection events, each insect detection event being indicative of one or more insects being present in the detection volume.

The system thus allows consistent and uniform monitoring of insect activity throughout even a large geographic area. Moreover, the monitoring process is performed with little or no disturbance to the natural insect behavior, thus avoiding undesired biases. The system is relatively cost effective and allows automatic operation and data collection.

The system may further comprise a data processing system communicatively coupled to the plurality of optical insect sensor devices and configured to:
  receive detector data from respective ones of the plurality of optical insect sensor devices, the detector data being indicative of one or more optically detected attributes associated with respective detected insect detection events, and to
  compute, from the received detector data, one or more quantities indicative of insect activity within the geographic area, e.g. an index of biodiversity, the number of detected insects of respective insect species, and/or the like.

Each of the insect sensors may be an optical insect sensor according to the third aspect described above. Each insect sensor device may be mounted at a stationary detection site or non-stationary, e.g. mounted on a vehicle, e.g. as described above.

In some embodiments, the detector data from respective insect sensor devices is calibrated according to a detector reference that is uniform across the plurality of insect sensors.

Accordingly detector data from different insect sensor devices are comparable. In particular, detector data from different insect sensor devices may be used for the calculation of a single index of insect biodiversity and/or for the calculation of other quantities related to insect activity. Moreover, indexes of biodiversity (or other quantities) calculated from detector data from different insect sensor devices are directly comparable.

In some embodiments, the calibration according to a uniform detector reference includes one or more of the following:
  1) A uniform calibration of the time axis for the detected time-resolved light intensities, thereby extracting consistent frequency characteristics of the wing beat behaviour. This may be achieved by uniform calibration of the respective processor clocks of the insect sensor devices.

2) A standardisation of the noise characteristics of the insect sensor devices in order for the insect sensor devices to have similar level of detection and in turn yield consistent body to wing ratios. The noise characteristics of the insect sensor devices are primarily determined by the characteristics of the light-sensitive sensor, e.g. by the characteristics of the quadrant detector and the performance of the transimpedance amplifier circuits associated with each of the individual detectors of the quadrant detector. These may be standardised by employing suitable manufacturing tolerances.

3) Calibration/Standardisation of the detectivity of each insect sensor device for each wavelength, thereby providing consistent melanisation ratio detection of different sensors.

The detectivity of the insect sensor device for a given wavelength is a combination of many factors including:

1) The level and exact spatial profile of the light emitted from the illumination module, in particular the spatial overlap of the two wavelengths throughout the entire detection volume.

2) The exact alignment of the optical detector module including lens, quadrant detector and the relative alignment of the two.

As the detectivity is the sum of several interdependent variables, it is not always possible to ensure an exact match of both factors between insect sensor devices. Consequently, a standardisation process is advantageously used to measure offsets between insect sensor devices and/or between different sensor areas of the same insect sensor device so as to allow for a suitable calibration. In some embodiments, this may be achieved by a calibration process where spheres or other objects of respective predefined colours are dropped within the detection volume of an insect sensor device. This may be done across the entire detection volume. By monitoring the ratio of signals in the different wavelength channels of the detector module a characteristic ratio for each insect sensor device can be detected and subsequently compensated for, e.g. by determining one or more offsets and/or one or more multiplicative factors and/or one or more other calibration functions for adjusting one or more of the respective intensity levels in the one or more wavelength bands. In some embodiments, respective calibration functions may be determined for each light-sensitive area, e.g. for each photodiode of an array of light sensitive areas. Accordingly, in some embodiments, each insect sensor device is configured to output calibrated detector data, calibrated at least based on a set of wavelength-specific detectivity data indicative of a device-specific and wavelength-specific detectivity of the insect sensor device in respect of one or more predetermined calibration objects within the detection volume at respective wavelengths.

In some embodiments, each insect sensor device comprises a communications interface for transferring data on detected insect detection events from the insect sensor device to the data processing system so as to allow the data processing system to collect standardised data from a plurality of optical insect sensor devices.

The communications interface may be a wired or a wireless interface configured for direct or indirect communication of detector data to the data processing system. For example, indirect communication may be via a gateway device, via one or more other insect sensor devices or another node for relaying the detector data. The communication may be via a suitable communications network, such as via a cellular telecommunications network, e.g. using GSM/GPRS, UMTS, EDGE, 4G, 5G or any other suitable cellular telecommunications standard. In some embodiments, the communications interface may be configured for communication via satellite. Alternatively or additionally, the insect sensor device may include a local data storage device for logging the detector data and for allowing the stored data to be retrievable via a data port or a removable data storage device.

The data processing system may be implemented as one or more suitably programmed computers, such as a stand-alone computer, as a plurality of communicatively coupled computers, e.g. as client server-system, as a virtual computer or the like. The data processing system may directly or indirectly be communicatively coupled to the one or more insect sensor devices and receive the collected detector data from the one or more insect sensor devices. To this end, the data processing system may comprise a suitable wired or wireless communications interface, e.g. as described in connection with the communications interface of the insect sensor devices.

The data processing system is configured, e.g. by a suitable computer program, to process the received detector data from the plurality of insect sensor devices, e.g. to compute one or more indexes of insect biodiversity from the received detector data and/or to compute another quantities associated to insect activity.

For example, the data processing system may compute a respective local index of insect biodiversity for each of the one or more individual insect sensor devices. Each local index of insect biodiversity may thus be indicative of the local insect biodiversity in the environment around a corresponding individual insect sensor device. Additionally or alternatively, the data processing system may compute an overall index of biodiversity from detector data received from a plurality of insect sensor devices located within a larger geographic area. The overall index of insect biodiversity may thus be indicative of insect biodiversity in a larger geographic area.

It will be appreciated that the processing unit and/or the data processing system may be implemented as a client-server or a similar distributed system, where the data acquisition and, optionally, some signal processing, is performed locally in the insect sensor device, while other parts of the data processing tasks may be performed by a remote host system.

In some embodiments, each insect sensor device may have an associated environmental sensor device while, in other embodiments, the system may include more or fewer environmental sensor devices compared to the number of insect sensor devices. Accordingly, a process of computing an index of biodiversity and/or another quantity associated with insect activity may, in addition to the optically detected attributes, further base the computation on environmental data associated with the optically detected attributes. For example, the process may base the computation of the index of biodiversity and/or of another quantity associated with insect activity on one or more of the following parameters indicative of environmental conditions during the period where the optically detected attributes have been recorded: ambient temperature, time of day, precipitation, humidity, wind speed, etc. or a combination thereof. To this end, a mathematical model may not only receive the optically detected attributes as input but also one or more environmental data or other additional data, such as the time of day, time of year, etc. Yet further, in some embodiments the process may compute the index of biodiversity and/or other quantity from the optically detected parameters and compensate the computed biodiversity index and/or other quantity for the sensed environmental data, e.g. by applying a suitable correction factor or other correction function. Suitable correction functions or factors may be based on training data, e.g. in the form of a trained machine learning model, a look-up table and/or the like.

The present disclosure relates to different aspects including the apparatus, sensor device and system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

According to another aspect, disclosed herein are embodiments of a computer-implemented method of determining an insect biodiversity index, the method comprising:

receiving detector data from one or more optical insect sensor devices, the detector data being indicative of one or more optically detected attributes associated with respective insect detection events, detected by the one or more insect sensor devices, wherein the detected insect detection events are taxonomically unclassified;

computing an index of insect biodiversity directly from the optically detected attributes associated with the taxonomically unclassified detection events.

According to another aspect, disclosed herein are embodiments of a data processing system configured to perform steps of the method described herein. In particular, the data processing system may have stored thereon program code adapted to cause, when executed by the data processing system, the data processing system to perform the steps of the method described herein. The data processing system may be embodied as a single computer or as a distributed system including multiple computers, e.g. a client-server system, a cloud based system, etc. The data processing system may include a data storage device for storing the computer program and detector data. The data processing system may include a communications interface for receiving detector data.

According to another aspect, a computer program comprises program code adapted to cause, when executed by a data processing system, the data processing system to perform the steps of the method described herein. The computer program may be embodied as a computer-readable medium, such as a CD-ROM, DVD, optical disc, memory card, flash memory, magnetic storage device, floppy disk, hard disk, etc. having stored thereon the computer program. According to one aspect, a computer-readable medium has stored thereon a computer program as described herein.

Additional aspects, embodiments, features and advantages will be made apparent from the following detailed description of embodiments and with reference to the accompanying drawings.

BRIEF DESCRIPTION OF THE DRAWINGS

Preferred embodiments will be described in more detail in connection with the appended drawings, where.

DETAILED DESCRIPTION

Figure 1:
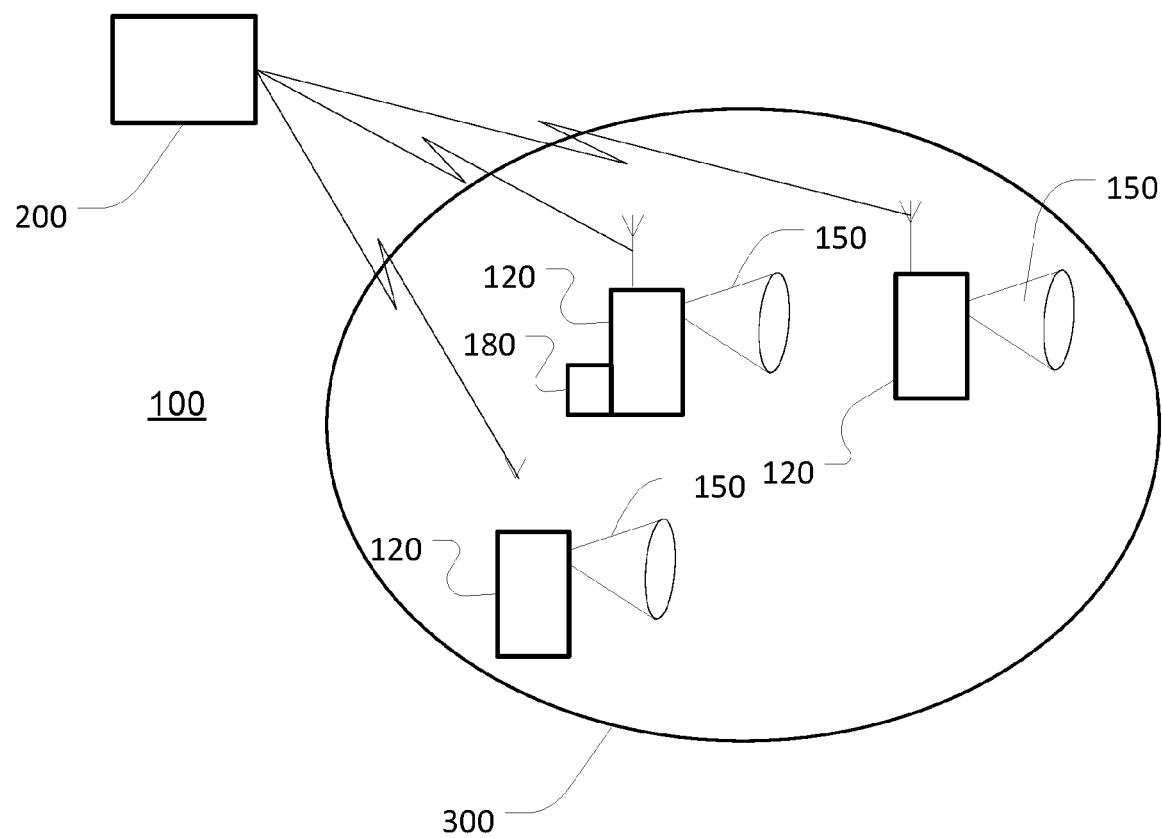
FIG. 1 shows a schematic view of an apparatus for determining an insect biodiversity index. The apparatus comprises a system of insect sensor devices.

FIG. 1 shows a schematic view of an apparatus for determining an insect biodiversity index. The apparatus, generally designated by reference numeral 100, comprises a system of insect sensor devices. In particular the apparatus comprises a data processing system 200 and a plurality of insect sensor devices 120. The insect sensor devices are deployed throughout a geographic area 300. Each insect sensor device 120 may be mounted on a suitable stationary or movable support, e.g. on a frame, on a stand, on a vehicle, etc.

As will be described in greater detail below, each insect sensor device may comprise an illumination module including a light source, such as one or more halogen lamps, one or more LEDs or the like, configured to illuminate an illuminated volume in a proximity of the insect sensor device. The insect sensor device may further comprise a detector module including one or more detectors and one or more optical elements configured to capture backscattered light from at least a portion of the illuminated volume and to guide the captured light onto the one or more detectors. The illuminated volume from which light is captured by the detector module for detecting insects is referred to as detection volume 150. Generally, the detection volume may be defined as the volume from which the detector module obtains light signals useful for detecting insects. The detection volume is typically defined by an overlap of the volume illuminated by the illumination module and by the field of view and depth of field of the detector module. In particular, the detection volume is not limited by any physical enclosure but is an open, unenclosed void or space which airborne, living insects may enter or exit in an unrestricted manner.

The insect sensor device comprises a processing unit configured to perform the detection of insects and to forward information about the detected insect population and associated optically detectable attributes to the data processing system.

Preferably, the insect sensor devices 120 are of the same type and calibrated and standardized according to a common detector reference, thus allowing detector data and attributes determined by them to be compared with each other and/or to be used as input to a computation of an overall index of insect diversity and/or another quantity indicative of insect activity associated with the geographic area 300.

The data processing system 200 may be a stand-alone computer or a system of multiple computers, e.g. a client-server system, a cloud-based system or the like. An example of a data processing system will be described in more detail below with reference to FIG. 2.

Each insect sensor device 120 is an optical insect sensor device using reflected/backscattered light from insects in a detection volume 150 to detect insects and to measure optically detectable attributes of the detected insects, e.g. one or more of the following: one or more wing beat frequencies, a body-to-wing ratio, a melanisation ratio (colour), a detected trajectory of movement of an insect inside the detection volume, a detected speed of movement of an insect inside the detection volume, an insect glossiness, or the like.

Generally, the insect sensor device detects insect detection events. An insect detection event refers to the detection of one or more insects being present in the detection volume. Detection of an insect detection event may be based on one or more trigger criteria, e.g. based on a signal level of the detected sensor signal and/or on another property of the sensor signals sensed by the detector module of the insect sensor device in response to the received light from the detection volume.

The detection volume 150 associated with each insect sensor device is a detection volume external to the corresponding insect sensor device located in the vicinity of the insect sensor device. An example of an insect sensor device will be described in more detail below with reference to FIG. 3. Examples of detection volumes will be described in more detail below with reference to FIGS. 6 and 7.

In the example of FIG. 1, the apparatus comprises three like insect sensor devices. It will be appreciated that other embodiments may include fewer or more insect sensor devices. For example, some embodiments may only include a single insect sensor device, while other embodiments may include 5, 10, 20, 100 or even more insect sensor devices. It will be appreciated, that the number of insect sensor devices may be chosen depending on factors such as the size and variability of the geographic area, the desired accuracy of the resulting biodiversity index or other computed quantity, the spatial resolution of respective local indexes of biodiversity or other local quantities, etc.

Each insect sensor device 120 is communicatively coupled to the data processing system 200 and communicates the collected detector data, including measured attributes to the data processing system 200. In the example of FIG. 1, each insect sensor device communicates the collected detector data via a cellular telecommunications network to the data processing system 200, e.g. via a GSM/GPRS network, USTM network, EDGE network, 4G network, 5G network or another suitable telecommunications network. It will be appreciated that the communication may be a direct communication or via one or more intermediate nodes. Similarly, the communication may use alternative or additional communications technologies, e.g. other types of wireless communication and/or wired communication. Yet further, the collected detector data may be stored locally by the insect sensor device for subsequent manual retrieval from each insect sensor device, e.g. on a portable data storage device and subsequent input to the data processing system 200.

The data processing system 200 is configured to execute a computer program for analysing the detector data from one or more insect sensor devices and for computing one or more desired quantities indicative of insect activity. In particular, the data processing system 200 may be configured to compute an index of insect biodiversity directly from the detector data as described herein, i.e. without intermediate taxonomic classification of the detected insects. The data processing device may output the computed index of insect biodiversity or other computed quantity in a suitable form, e.g. on a display, on a storage device, via a data communications interface, and/or the like.

In the example of FIG. 1, one of the insect sensor devices comprises an environmental sensor device 180 for sensing one or more environmental parameters, such as temperature, wind speed, humidity and/or other weather data. The sensed environmental data is also communicated to the data processing system, e.g. directly by the environmental sensor device or by the insect sensor device. It will be appreciated that, in some embodiments, each insect sensor includes or is operationally coupled to, an environmental sensor device. In other embodiments only a subset of insect sensor devices include or are operationally coupled to an environmental sensor device. Alternatively or additionally, the apparatus may include one or more environmental sensor devices deployed in the geographic area 300 and communicatively coupled to the data processing system 200, separately from the insect sensor devices. The data processing system may thus also base the computation of the index of biodiversity or other quantity on the environmental data sensed by the environmental sensor device(s), e.g. by computing a modified index of insect biodiversity or otherwise relating the computed index of insect biodiversity to the sensed environmental conditions.

It will be appreciated that, while the system of the plurality of insect sensor devices and the data processing system of FIG. 1 is particularly suitable for determining an index of biodiversity, embodiments of the system may also be used to determine other quantities indicative of insect activity within a geographic area, e.g. for monitoring the insect activity within an agricultural production area, such as one or more fields for growing crops.

Figure 2:
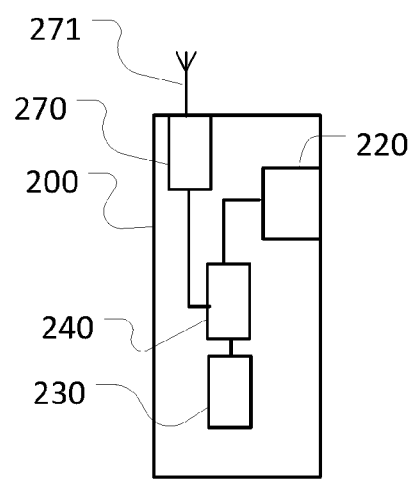
FIG. 2 schematically illustrates an embodiment of a data processing system.

FIG. 2 shows a schematic view of an example of a data processing system 200, e.g. the data processing system 200 of the apparatus of FIG. 1.

The data processing system 200 comprises a central processing unit 240 or other suitable processing unit. The data processing system further comprises a data storage device 230 for storing program code, received detector data and, optionally, a mathematical model for computing the index of insect biodiversity. Examples of suitable data storage devices include a hard disk, an EPROM, etc. The data processing system further comprises a data communications interface 270, e.g. a network adaptor, a GSM module or another suitable circuit for communicating via a cellular communications network or via another wireless communications technology. To this end, the data processing system further comprise an antenna 271. It will be appreciated that the data processing system may include a wired data communications interface instead of or in addition to a wireless communication interface. The data processing system further comprises an output interface 220 e.g. a display, a data output port, or the like.

Figure 3:
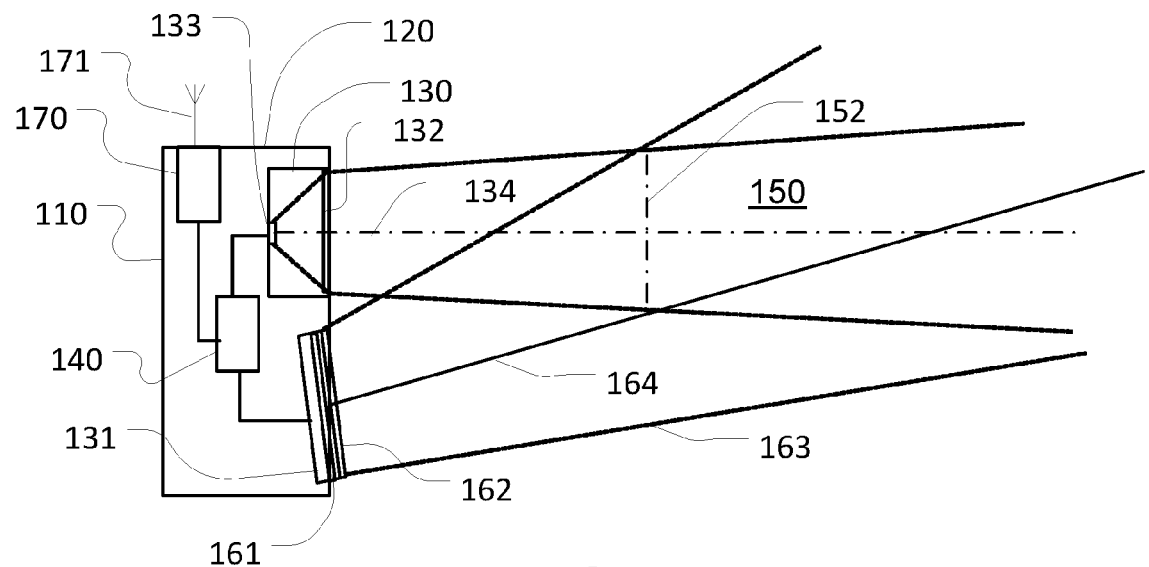
FIGS. 3 and 4 schematically illustrate embodiments of an insect sensor device.

FIG. 3 schematically illustrates an embodiment of an insect sensor device, e.g. one of the insect sensor devices of the system of FIG. 1. The insect sensor device, generally designated by reference numeral 120, comprises a processing unit 140, a detector module 130 and an illumination module 131, all accommodated within a housing 110. In this example, the illumination module and the detector module are vertically aligned with each other and the illumination module is arranged below the detector module. However, other arrangements are possible as well.

Generally, in order to maximize the amount of backscattered light from insects inside the detection volume 150, it may be preferable to position the illumination module adjacent or otherwise close to the detector module, such that the illumination direction and the viewing direction only define a relatively small angle between them, e.g. less than 30°, such as less than 20°. In some embodiments, the illumination module is configured to emit a beam of light along an illumination direction, and the detector module defines a viewing direction, e.g. as an optical axis of the detector module, wherein the illumination direction and the viewing direction define an angle between each other, the angle being between 1° and 30°, such as between 5° and 20°.

The illumination module comprises an array of light-emitting diodes (LEDs) 161 and a corresponding array of lenses 162 for directing the light from the respective LEDs as a diverging beam 163 along an illumination direction 164. The array of light emitting diodes may comprise a first set of diodes configured to selectively emit light at a first wavelength band, e.g. at 808 nm+/−25 nm. The array of light emitting diodes may further comprise a second set of diodes configured to selectively emit light at a second wavelength band, different from the first wavelength band, in particular spaced-apart from the first wavelength band, e.g. at 970 nm+/−25 nm. In other embodiments, the array of light emitting diodes may include alternative or additional types of LEDs or only a single type of LEDs. For example, in some embodiments, the LEDs may be configured to emit broad-band visible, near-infrared and/or infrared light.

The detector module 130 comprises an optical system 132 in the form of a Fresnel lens. Alternative another lens system may be used, e.g. an NIR coated aspheric lens, e.g. having 60 mm focal length and an ø76.2 mm aperture. The detector module 130 includes an optical sensor 133, e.g. one or more photodiodes, such as an array of photodiodes, a CCD or CMOS sensor and the optical system directs light from the detection volume onto the optical sensor. In some embodiments, the optical system images an object plane 152 inside the illuminated volume onto the optical sensor. The field of view of the optical system and the depth of field of the optical system are configured such that the optical system directs light from a portion of the volume illuminated by the illumination module onto the optical sensor. The portion of the illuminated volume from which the optical system receives light such that it can be detected by the optical sensor and used for detection of insects defines a detection volume 150. The optical system 132 defines an optical axis 134 that intersects with the illumination direction 164, preferably at a small angle, such as 10°.

For example, when an optical system is based on a camera lens having f=24 mm, f/2.8 and an optical sensor includes a ¾" image sensor, the detector module may be configured to focus on an object plane at 2 m distance from the lens, corresponding to a field of view of approximately 1.7 m×1.7 m and a depth of field of approximately 1.3 m, thus resulting in a detection volume of approx. 3.7 $m^3$.

The detector module 130 is communicatively coupled to the processing unit 140 and forwards a sensor signal indicative of the captured radiation by the optical sensor 133 to the processing unit. The processing unit 140 may include a suitably programmed computer or another suitable processing device or system. The processing unit receives the sensor signal, e.g. an image or stream of images and/or one or more sensed light intensities from respective one or more photodiodes and, optionally, further sensor signals from the detector module. The processing unit 140 processes the received sensor signals so as to detect and identify insects in the detection volume and output detector data indicative of detected insect detection events and associated optically detectable attributes.

Figure 4:
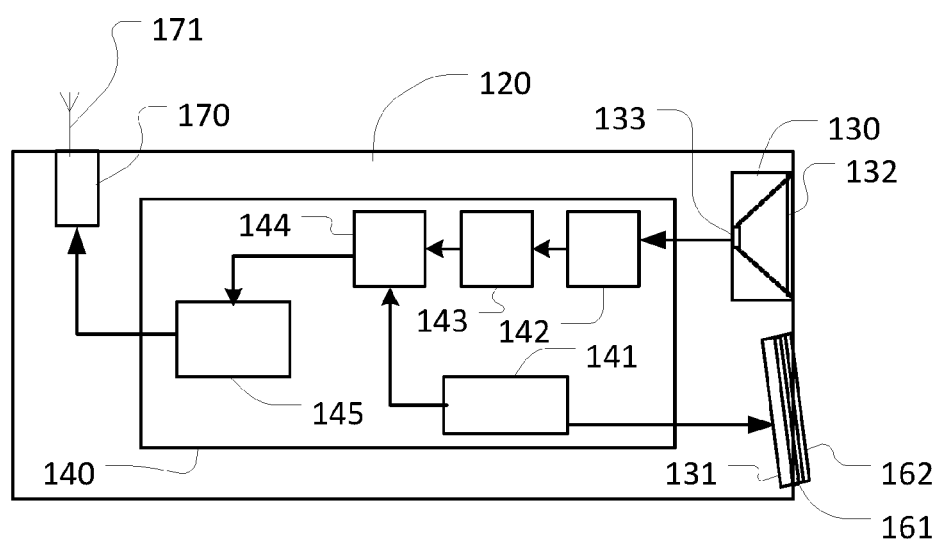

FIG. 4 schematically illustrates a more detailed view of an example of the insect sensor device. The insect sensor device 120 of FIG. 4 is similar to the insect sensor device of FIG. 3 and comprises a processing unit 140, a detector module 130 and an illumination module 131, all accommodated within a housing 110 and all as described in connection with FIG. 3. In this example, the illumination module 131 includes an array of light emitting diodes (LEDs). The LEDs may be arranged in a 2D pattern, such as on a regular 2D grid. The LEDs may be distributed over an area of at least 10 $cm^2$, such as at least 30 $cm^2$, such as at least 60 $cm^2$, such as at least 80 $cm^2$. In some embodiments, the LEDs may be distributed over an area between 10 $cm^2$ and 400 $cm^2$, such as between 30 $cm^2$ and 300 $cm^2$, such as between 40 $cm^2$ and 200 $cm^2$, such as between 60 $cm^2$ and 120 $cm^2$, e.g. about 90 $cm^2$. Accordingly, an illumination beam having a large cross-sectional area may be emitted so as to illuminate a large volume simultaneously. The light emitted from each diode may be partially collimated by an asymmetrical lens to form a diverging beam, e.g. expanded with 40° and 8° diverging angles in the vertical and horizontal axis, respectively (measured as full divergence angles). The array of LEDs may all emit the same wavelength band or be arranged in such a way as to mix multiple wavelengths. In one example, the illumination module emits light at two different narrow wavelength bands, i.e. a first band at a first wavelength and a second band at a second wavelength, such as at 808 nm and 970 nm, respectively. Other embodiments may include a single type of LEDs or more than two different types of LEDs. The light from the illumination module is modulated at one or at multiple respective frequencies, e.g. the light at each wavelength may be encoded with a unique frequency. In one example, the light at the first wavelength is modulated at a first modulation frequency and the light at a second wavelength is modulated at a second modulation frequency, different form the first modulation frequency. The first and second modulation frequencies may each be selected between 10 kHz and 500 kHz, such as between 50 kHz and 200 kHz. In one example, the first modulation frequency is about 80 kHz and the second modulation frequency is about 120 kHz. To this end, the processing unit includes a synchronization circuit 141 having a clock for controlling the illumination module.

The detector module 131 includes an image sensor 133 including a 2×2 array of light-sensitive elements, such as photodiodes. In one particular embodiment, the image sensor is a quadrant detector with four individual Si photodiodes arranged in a square. It will be appreciated that other embodiments may include a larger array of light-sensitive elements or a smaller array or light sensitive elements, such as a 2×1 array, or even a single light sensitive element. The optical system 132 is arranged relative to the photodiode sensor array in such a way as to image an image plane within the detection volume onto the photodiode array. The four light-sensitive areas thus collect light from four substantially separate sub-volumes of the detection volume.

The detected signals from the photodiode array 133 are fed into the processing unit 140. The processing unit includes an amplifier bank 142 with a number of amplifiers matching the size of the photodiode array. In this example, the amplifier bank includes four transimpedance amplifiers. The amplified signals are fed into a corresponding A/D converter bank 143 which includes a number of A/D converters corresponding to the size of the photodiode array, such as four A/D converters. The A/D converter bank 143 generates respective digital time-resolved signals for the individual photodiodes. The processing unit further comprises a de-multiplexer circuit 144, e.g. an FPGA implementing a number of digital lock-in amplifiers corresponding to the size of the photodiode array and to the number of wavelengths. In one example, the de-multiplexer circuit implements eight lock-in amplifiers corresponding to the four quadrants of the quadrant detector and two individually modulated wavelengths. The de-multiplexer circuit 144 de-multiplexes the signals from each of the photodiodes into separate signals, optionally into separate signals for the respective wavelengths, i.e. for each photodiode, the de-multiplexer circuit generates one signal for each individually modulated wavelength. To this end, the de-multiplexing circuit receives a clock signal from the synchronisation circuit 141. The lock-in amplifiers further serve as an efficient filter for light not modulated with frequencies around the two lock-in frequencies.

The resulting de-multiplexed signals thus include one or more, e.g. two, wavelength-specific channels for each photodiode, e.g. 2×4 channels. It will be appreciated that, in embodiments with a different number of wavelengths or a different array size, the number of de-multiplexed signals will generally be different. The de-multiplexed signals are forwarded to a data processing circuit 145 which processes the individual signals to detect insects being present in the detection volume, i.e. to detect insect detection events, and to determine one or more attributes of each detected insect. To this end, the data processing circuit 145 may initially perform a calibration of the signal, e.g. based on stored calibration data, such as stored offsets and/or multiplicative factors. The data processing circuit outputs detector data indicative of the insect detection events and the associated determined attributes. The data processing circuit may further log detector data associated with multiple insect detection events. The data processing circuit may intermittently, e.g. periodically, upon request, or when the internal log buffer is about to be full, communicate the recorded detector data via the communications interface 170 to a remote data processing system as described herein.

Figure 5:
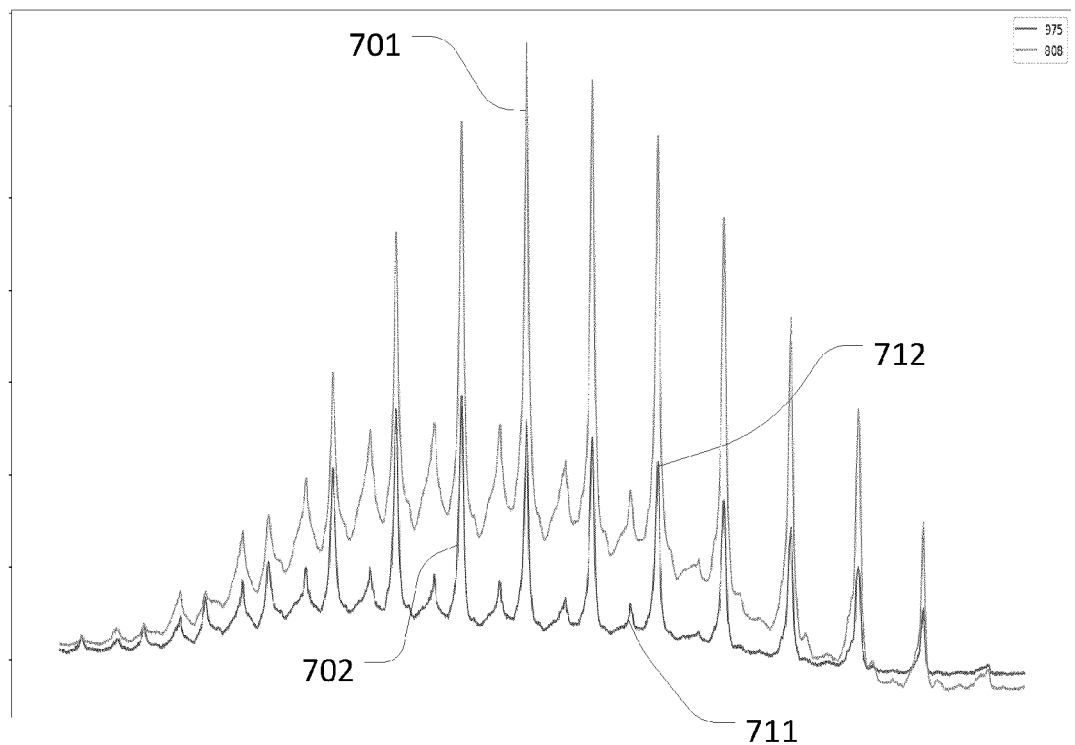
FIG. 5 schematically illustrates an example of sensor signals from a detector module of an embodiment of an insect sensor device as described herein.

FIG. 5 schematically illustrates an example of de-multiplexed sensor signals from a detector module of an embodiment of an insect sensor device as described herein, e.g. an insect sensor device as described in connection with FIG. 3 or 4. In this example, the sensor signals from the detector module includes respective time series of detected light intensities at two narrow wavelength bands, e.g. as recorded by respective photodiodes provided with respective band-pass filters or by one of the photodiodes of the array of FIG. 4. In some embodiments the signal may be integrated or otherwise combined from multiple photodiodes, from an image sensor and/or the like.

In this example, time series 701 corresponds to detected light at 808 nm while time series 702 corresponds to detected light at 970 nm. However, other embodiments may use other wavelengths and/or more than two wavelengths or wavelength bands.

The processing unit of an insect sensor device may process the times series to detect the presence of an insect in the detection volume and to determine one or more attributes of the detected insect. Alternatively, some or all of the signal and data processing may be performed by a data processing system external to the insect sensor device.

In the present example, the process implemented by the processing unit and/or an external data processing system may detect the presence of detected radiation above a predetermined threshold and/or determine a fundamental harmonic of the detected frequency response so as to detect the presence of an insect, i.e. to identify an insect detection event.

For example, in one embodiment, the processing unit of the insect sensor device records data for a given interval (typically ten minutes), extracts events and metadata and then starts a new recording. The recorded data may include respective time series of the de-multiplexed channels of sensor signals.

To extract the events from the recorded raw data, the process estimates a rolling temporal mean and standard deviation. To this end, in each window, the data is reduced by a factor 10 before the mean and standard deviation is calculated.

An event threshold is then defined by multiplying the estimated standard deviation with a signal to noise factor (SNR), resulting in a threshold map representing the data of the respective channels.

Finally, the estimated rolling mean is removed from the signal and the events are extracted by applying the threshold map. The data associated with the extracted events are stored on the insect sensor device and uploaded, e.g. via cellular connection, to a cloud database or other suitable data repository as soon as a connection is available. In cases where no cellular or other data connection is available, it is possible to store the extracted events locally on the insect senor device.

A process implemented by a cloud service or another type of data processing system external to the insect sensor device may perform data processing of the recorded data associated with the detected insect detection events. It will be appreciated, however, that some or even all of the subsequent processing may also be performed locally on the insect sensor device.

In any event, the process may compute one or more attributes of the insects associated with the detected insect events. Examples of such attributes include a fundamental wing beat frequency (WBF), a body-wing ratio (BWR) and a melanisation ratio (MEL).

For example, the process may compute the fundamental wing beat frequency (WBF) from the determined fundamental harmonic of the frequency response of a detected detection event. The process may compute the body-wing ratio as a mean ratio between a wing and body signal. The body signal may be determined as a baseline signal 711 of a detection event which represents the scattering from the insect with closed wings while the wing signal may be determined as the signal levels 712 at the peaks in scattering.

The melanisation ratio may be determined as a mean ratio between the signal strengths of the two recorded channels during a detection event.

Based on respective sets of one or more of the above attributes, associated with a plurality of insect detection events, optionally in combination with other parameters, a data processing system may compute an index of insect of biodiversity.

Generally, embodiments of the insect sensor device described herein provide a detection volume that is large enough for the detector module to observe a number of insects representative for the population density in the area. The detection volume is also small enough to be sufficiently uniformly illuminated so as to provide high signal strength at the image sensor.

Moreover, embodiments of the apparatus described herein provide fast observation times, e.g. so as to reliably detect insects even in situations of high insect activity. Moreover embodiments of the apparatus described herein provide long enough observation times to be able to reliably determine attributes of the flying insects.

Figure 6:
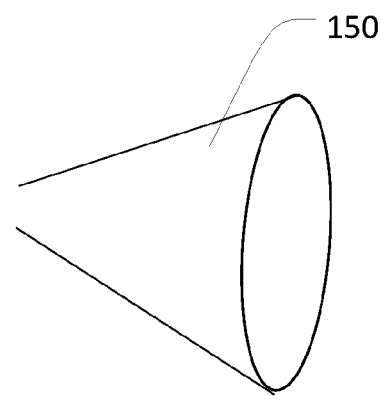
FIGS. 6 and 7 illustrate examples of detection volumes.
Figure 7:
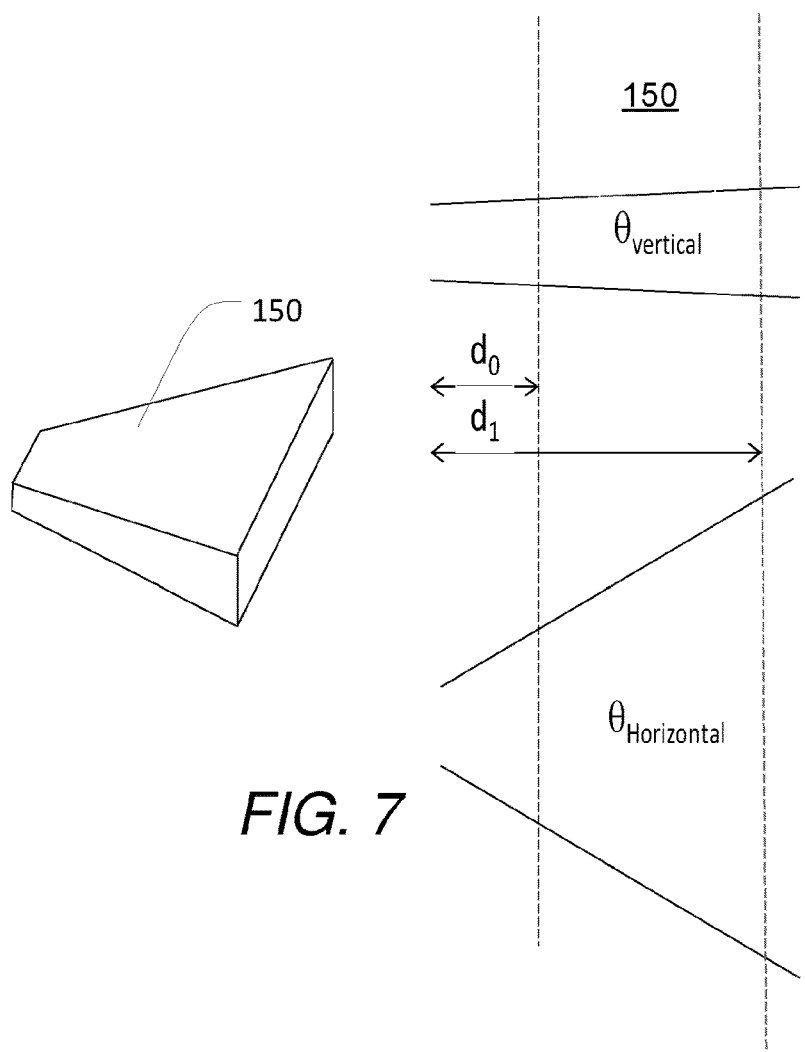

FIGS. 6 and 7 illustrate examples of detection volumes. FIG. 6 schematically shows an example of a frusto-conical detection volume resulting from an illumination module emitting a diverging light beam with a generally circular cross section. FIG. 7 schematically illustrates an example of a frusto-pyramidal detection volume.

In order to compute an accurate index of insect biodiversity it is preferable that the recorded insect activity is representative for the area under consideration. In order to achieve this, sufficiently high counting statistics are preferred.

As described herein, some embodiments of the insect sensor device described herein record one or more time series of light scattering off one or more insects in flight at one or more wavelengths of the light. From the recorded time series, the wing beat frequency and/or ratio of scattering from body and wings, respectively, can be computed. However, in order to obtain a reliable and accurate detection result, the recorded time series should be long enough for multiple wingbeats to occur. The wingbeat frequency of insects in flight spans from around 10 Hz to around a 1000 Hz. In order to get more than 10 wings beats the time the insect is in the detection volume should, in the worst case, be preferably more than 100 ms or even 1 s. Similarly, a detection based on recorded flight trajectories is facilitated by observation times long enough to record trajectories of sufficient lengths.

Embodiments of the insect sensor device described herein thus employ a detection volume shaped and sized to allow sufficiently long observation times, even when sensor is moving across an area of land.

The extent of the detection volume in a direction along an optical axis of the detector module should preferably be larger than 50 cm, such as larger than 1 m, such as larger than 2 m, such as larger than 5 m in order to ensure that insects are likely to remain inside the detection volume sufficiently long. For example, the length of the detection volume along the optical axis of the detector volume may be less than 100 m, such as less than 50 m, such as less than 20 m, such as less than 10 m.

Furthermore, as discussed above, it is preferred that the total detection volume is of the order of, or larger than, 1 m³ such as larger than 1 m³. In order to achieve such a detection volume with one or a system of small and cost-efficient insect sensor devices, it is preferred that the illumination module is carefully configured, and that the detection volume of the individual insect sensor is relatively large, such as larger than 10 l.

The illuminated detection volumes shown in FIGS. 6 and 7 both provide large detection volumes in the vicinity of the insect sensor device, i.e. allowing representative and local measurements.

The detection volumes shown in FIGS. 6 and 7 represent an overlap between an illuminated volume, illuminated by an illumination module of the insect sensor device, and by a detectable volume from which a detector of the insect sensor device receives light, i.e. the detectable volume may be defined by a field of view and depth of field of the detector. In one embodiment, the illumination module comprises one or more suitable light sources, e.g. one or more high-power LEDs, emitting light which is diverging from the illumination module so as to distribute light into a large volume. In one particular embodiment, the illumination module is configured to emit light with a full divergence angle in the horizontal plane that is larger than 5°, such as larger than 10° such as larger than 20°, while the vertical divergence is limited to angles smaller than 2° such as smaller than 5°. The resulting detection volume consequently will be optimized in space just above the vegetation canopy. Moreover, in this embodiment, the amount of light which disappears upwards or into the vegetation is limited. In another embodiment, the illumination module is configured to emit light with a full divergence angle in the vertical plane that is larger than 5°, such as larger than 10° such as larger than 20°, such as larger than 30°, while the horizontal divergence is limited to angles smaller than 15° such as smaller than 10°. This embodiment allows a compact design of the insect sensor device with the detector and illumination modules arranged one above the other.

It is further preferred that the illumination module is configured so as to direct the illumination light along a center optical axis of the radiated light (i.e. along a direction of illumination) that points upwards in such an angle as to completely eliminate light form hitting the crop, e.g. between 1° and 30°, such as between 2° and 30°, such as between 5° and 20°.

An example of a detection volume resulting from such a diverging, pie-shaped, forward-upwardly directed illumination beam is illustrated in FIG. 7. In particular, FIG. 7 illustrates a 3D view of the detection volume 150 as well as a side view and a top view of the detection volume. In the example of FIG. 7, the distance $d_0$ between the aperture of the detector module and the start of the detection volume is about 1 m. The distance $d_1$ between the aperture of the detector module and the far end of the detection volume is about 10 m. The divergence angle $\theta_{vertical}$ of the diverging light beam in the vertical direction (full angle) is about 4° while the divergence angle $\theta_{Horizontal}$ in the horizontal direction (full angle) is about 20°. However, it will be appreciated that other embodiments may have different size and/or shape. For example, the divergence angle $\lambda_{vertical}$ of the diverging light beam in the vertical direction (full angle) may be about 40° while the divergence angle $\lambda_{Horizontal}$ in the horizontal direction (full angle) is about 8°.

Generally, when the detection volume is positioned close to the insect sensor device efficient illumination of the detection volume and reliable detection of small insects is facilitated. For example, the boundary of the detection volume closest to an aperture of the detector module may be between 1 cm and 10 m away from the aperture of the detector module, such as between 10 cm and 5 m, such as between 10 cm and 2 m. The boundary of the detection volume furthest from an aperture of the detector module may be between 3 m and 100 m away from the aperture of the detector module, such as between 5 m and 20 m, such as between 8 m and 12 m.

Figure 8:
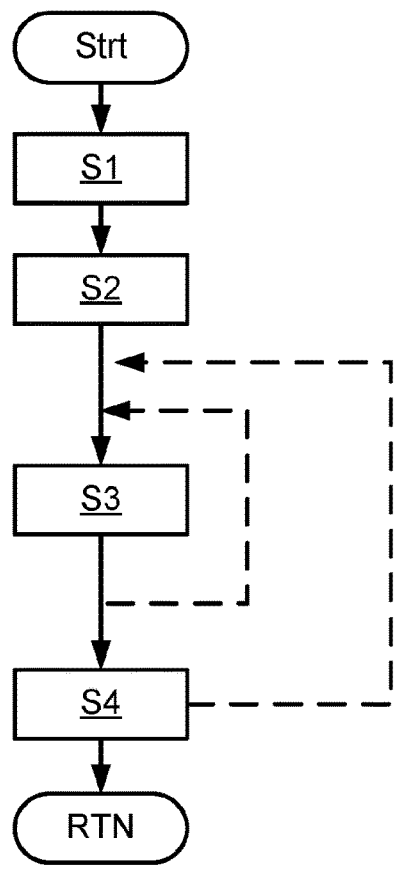
FIG. 8 shows a flow diagram of an example of a method for determining an index of insect biodiversity.

FIG. 8 shows a flow diagram of an example of a method for determining an insect biodiversity index spraying insecticides.

In initial step S1, a set of insect sensor devices are provided. In particular, the insect sensor devices are calibrated and standardized according to a common reference as described herein.

For example, the calibration process may include the following steps:

A plurality of objects, e.g. balls, of respective colors are caused to move in the detection volume, e.g. by dropping the objects such that they traverse the detection volume of the insect sensor device. The sensor signals for each of the objects are recorded. This is repeated a plurality of times with objects moving at different positions within the detection volume. Preferably, for each position, sensor signals for a plurality of object movements, such as at least 100, such as more than 500 movements of objects having different color are recorded. The sensor signals may represent detected intensities (denoted $I_{80\_1}$ and $I_{\lambda,2}$, respectively) at two wavelength bands around wavelengths $\lambda_1$ and $\lambda_2$, respectively, as described herein. For each object, the ratio $I_{\lambda 1}/(I_{80\_1}+I_{\lambda,2})$ or another measure of the relative detected intensity at the two wavelengths is calculated. In one embodiment $\lambda_1=808$ nm and $\lambda_2=970$ nm. In case of a sensor array such as a quadrant detector this may be done for each light-sensitive area of the array. The distribution of detected ratios may be recorded (e.g. for each light-sensitive array) and the sensor signals may be adjusted by respective calibration functions so as to cause the calibrated distributions to conform with a reference distribution, e.g. such that the peak of the distribution is located at a common reference value. Knowing these calibration functions, melanisation ratios observed on insects by different insect sensor devices can be compensated to yield identical results compensated for variations in spatial overlap of the wavelengths and the exact overlap of the two wavelengths.

In step S2, the insect sensors are deployed in a geographic area for which an index of insect biodiversity is to be computed.

In step S3, detector data indicative of respective insect detection events are recorded and associated optically detectable attributes are computed. This step may be repeated for a predetermined period of time or until sufficient data has been collected.

In step S4 a biodiversity index is calculated based on detector data from the set of insect sensor devices. Again the collection of data and computation of a biodiversity index may be repeated, e.g. in order to analyse a change of biodiversity over time.

Example of Biodiversity Calculation—Total Variance Method

Insect biodiversity is conventionally measured by a combination of species richness (number of different species recorded in a sample) and aggregate statistics such as the Simpson's biodiversity index, which takes into account the relative abundance of species.

Figure 9A:
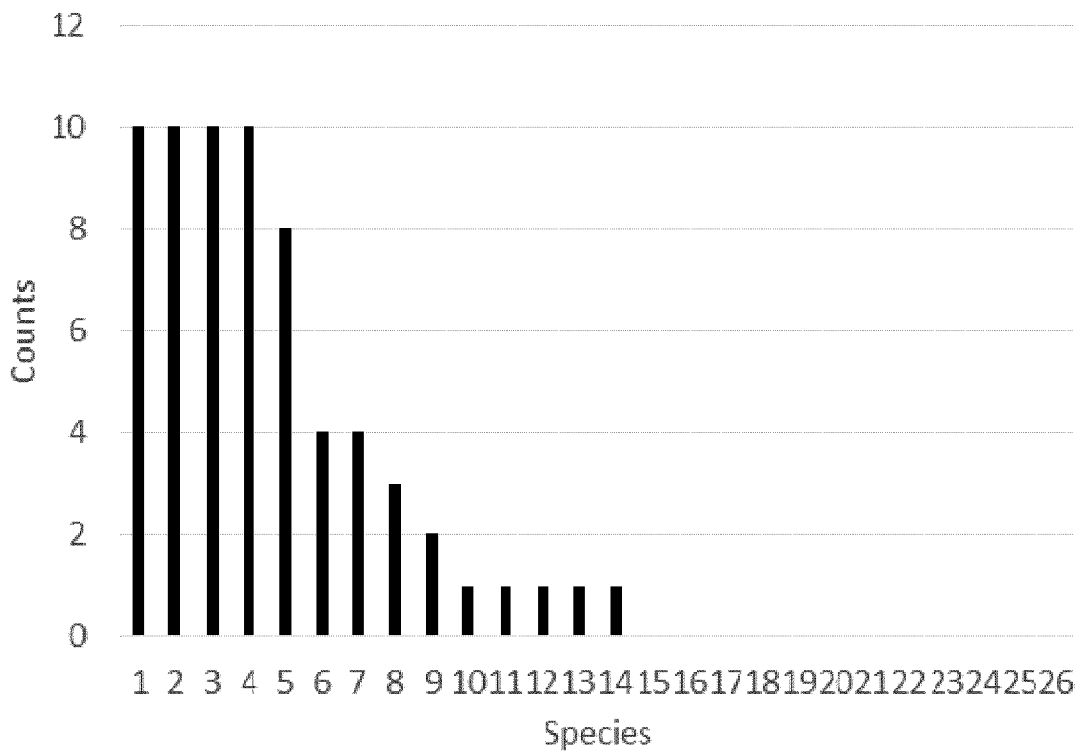
FIGS. 9A and 9B shows insect counts collected by conventional trapping methods from two fields with different degrees of biodiversity.
Figure 9B:
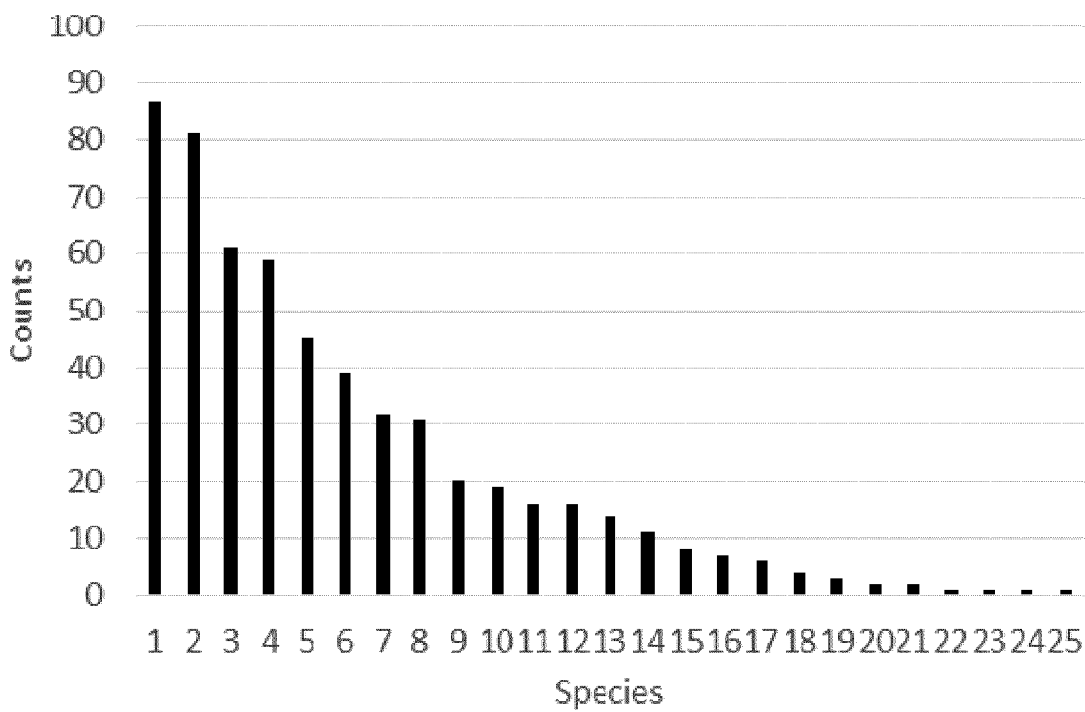

FIGS. 9A and 9B show insects collected by conventional trapping methods from two fields with different degrees of biodiversity. The figures show histograms representing the number of counts per species for two fields with different degrees of biodiversity. FIG. 9A shows the number of counts for a field with low biodiversity while FIG. 9B shows corresponding counts for a field with high biodiversity.

The insects have been taxonomically classified by an expert in the field using a microscope. In the low biodiversity field, a total of 14 different insect species were identified, whereas in the high biodiversity field 25 different insect species were identified over the same period in the same traps. Including the relative numbers of each species, a Simpson's biodiversity index can be calculated of 0.635 for the low biodiversity field and 0.828 for the high biodiversity field.

Figure 10A:
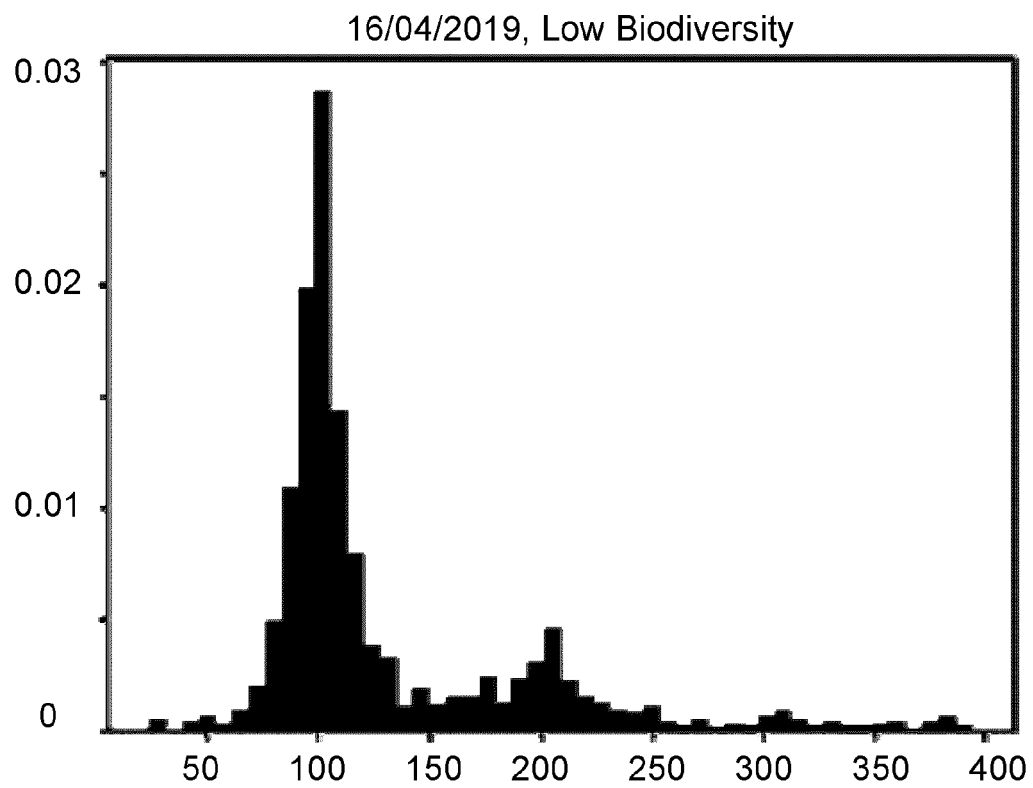
FIGS. 10A and 10B show corresponding histograms of wing beat frequencies collected for the two fields by an insect sensor device as described herein.
Figure 10B:
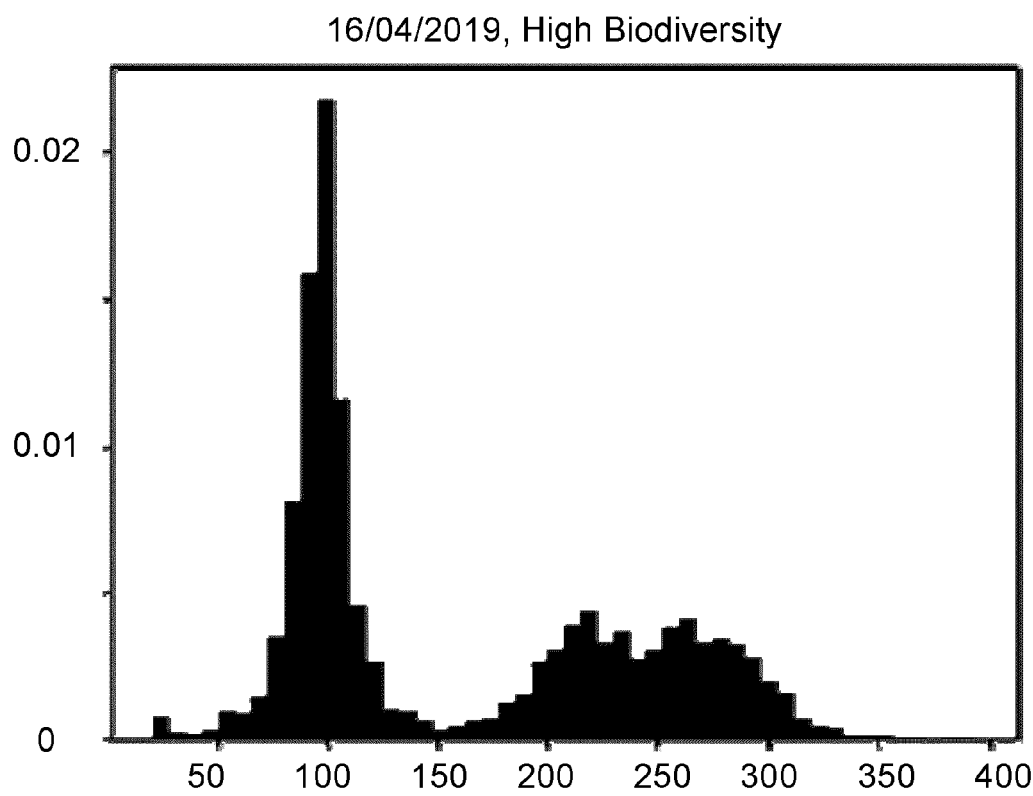

FIGS. 10A and 10B show corresponding histograms of wing beat frequencies collected for the two fields by an insect sensor device as described herein. FIG. 10A shows the number of counts for a field with low biodiversity while FIG. 10B shows corresponding counts for a field with high biodiversity. From visual inspection it is clear that there are wingbeat frequencies present in the high biodiversity field that are not present in the low biodiversity field, particularly around the higher frequencies between 200 Hz and 300 Hz.

Both fields have a dominant peak at 100 Hz, but this peak is slightly less dominant in the high biodiversity histogram than the low biodiversity histogram.

Similar histograms are available with different features of field insects, such as body/wing ratio and melanisation, and each of these and their combination can be interpreted to provide a comparative picture of biodiversity.

Some embodiments of the apparatus described herein characterize, without the need for taxonomic identification of every detected insect, the insect diversity as a statistic measure computed from the distribution of attributes such as wing beat frequency.

Figure 11:
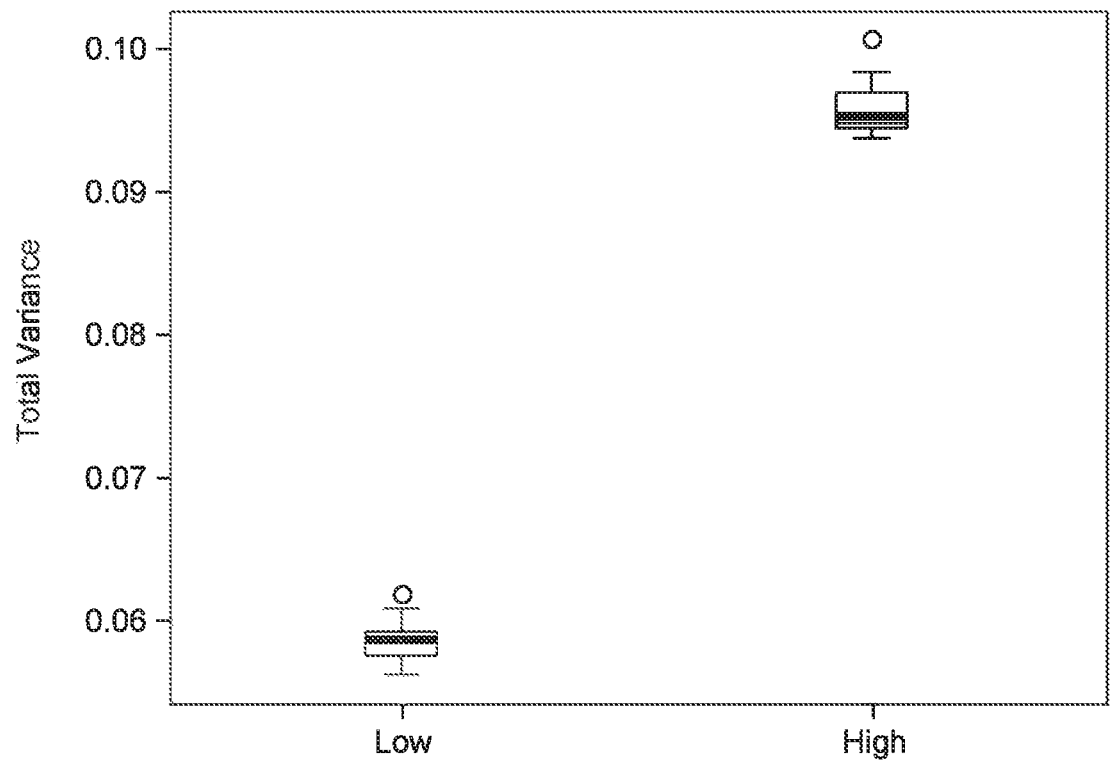
FIG. 11 shows an example of a calculated biodiversity prediction based on sensor data for the low biodiversity field (left) and the high biodiversity field (right).

FIG. 11 shows a calculated biodiversity prediction based on sensor data for the low biodiversity field (left) and the high biodiversity field (right).

Although the invention has been described with reference to certain specific embodiments, various modifications thereof will be apparent to those skilled in art without departing from the spirit and scope of the invention as outlined in claims appended hereto.

In summary, advantages of some or all of the disclosed embodiments include:

Real time monitoring

The ability to detect variations in biodiversity on a day to day, hour to hour and even minute to minute basis Unbiased, no use of pheromones or other methods of manipulating insect activity are needed.

Cheap and accessible

Labour and "laboratory" free

Standardises data collection and format

Improves ability to compare biodiversity measurements

Resulting index may contain more information

Reduces risk of human and systematic error

It will be appreciated that insects vary a lot in size and behavior. Insect sizes can vary from less than one mm to a few cm and movement patterns of insects can vary from insects standing still, hovering, in air to jumping insects with ballistic trajectories. Embodiments of the apparatus and insect sensor device described herein have been found useful for various types of airborne insects, including flying insects having wings and jumping insects, such as jumping flea beetle, e.g. cabbage stem flea beetle (*Psylliodes chrysocephala*).

The invention claimed is:

1. An apparatus for determining an index of insect biodiversity, comprising:
   a plurality of insect sensor devices configured to be individually positioned within a geographic area, each of the plurality of insect sensor devices configured to:
   monitor insect activity within a detection volume extending outside the insect sensor device, and
   output detector data indicative of one or more detected attributes associated with respective detected insect detection events, each insect detection event being indicative of one or more insects being present in the detection volume;
   a data processing system communicatively coupled to the plurality of insect sensor devices and configured to:
   receive the detector data from respective ones of the plurality of insect sensor devices, the detector data being indicative of one or more detected attributes associated with respective detected insect detection events, and compute, from the received detector data, an index of insect biodiversity indicative of insect biodiversity within the geographic area, wherein the detected insect detection events are taxonomically unclassified and wherein the data processing system is configured to compute the index of insect biodiversity directly from the detected attributes associated with the taxonomically unclassified detection events.

2. An apparatus according to claim 1, wherein the plurality of insect sensor devices is a plurality of insect sensor devices, each configured to monitor insect activity within a detection volume extending outside the insect sensor device by detecting light from the detection volume, and wherein the one or more detected attributes are one or more optically detected attributes.

3. An apparatus for determining an index of insect biodiversity, comprising:
one or more insect sensor devices configured to be individually positioned within a geographic area, each of the one or more insect sensor devices configured to:
monitor insect activity within a detection volume to detect one or more insect detection events, each insect detection event being indicative of one or more insects being present in the detection volume, and
output detector data indicative of one or more detected attributes associated with respective detected insect detection events,
a data processing system communicatively coupled to the one or more insect sensor devices and configured to:
receive the detector data from the one or more optical-insect sensor devices, the detector data being indicative of one or more detected attributes associated with respective detected insect detection events, wherein the detected insect detection events are taxonomically unclassified, and
compute an index of insect biodiversity directly from the detected attributes associated with the taxonomically unclassified detection events.

4. An apparatus according to claim 3, wherein the data processing system is configured to compute the index of insect biodiversity as a measure of variability of the detected attributes associated with respective detected insect detection events.

5. An apparatus according to claim 4, wherein the data processing system is configured to compute the measure of variability by performing a statistical analysis of the detected attributes, the statistical analysis being a multivariate analysis associated with respective detected insect detection events.

6. An apparatus according to claim 4, wherein the data processing system is configured to compute the measure of variability at least by performing a clustering of the detected insect detection events according to at least the detected attributes associated with the respective detected insect detection events.

7. An apparatus according to claim 3, wherein the data processing system is configured to compute the index of insect biodiversity based on a mathematical model, the mathematical model being a trained machine learning model trained by supervised learning that directly maps the detected attributes associated with respective detected insect detection events to an index of insect biodiversity.

8. An apparatus according to claim 3, wherein each insect sensor device of the plurality of insect sensor devices is calibrated based on a common detector reference.

9. An apparatus according to claim 3, wherein each insect sensor device is an optical insect sensor device configured to output calibrated detector data based on a set of wavelength-specific detectivity data indicative of a wavelength-specific detectivity of each optical insect sensor device in respect of one or more predetermined calibration objects within the detection volume at respective wavelengths.

10. An apparatus according to claim 3, wherein the detected attributes are optically detected attributes and include one or more attributes selected from the group of:
a detected trajectory of movement of an insect inside the detection volume;
a detected speed of movement of an insect inside the detection volume;
one or more detected wing beat frequencies;
a melanisation ratio;
an insect glossiness.

11. An apparatus according to claim 3, further comprising one or more environmental sensor devices configured to sense environmental data indicative of an environmental condition of the geographic area; and wherein the data processing system is configured to receive the environmental data and to compute the index of insect biodiversity from the received detector data and from the sensed environmental data.

12. An apparatus according to claim 3, wherein each insect sensor device is an optical insect sensor device and comprises:
an illumination module configured to illuminate the detection volume with illumination light comprising light at a first wavelength band modulated at a first modulation frequency;
a detector module comprising a detector configured to detect light from the detection volume; and
a processing unit configured to receive sensor signals from the detector module and configured to filter the received sensor signal to extract a first sensor signal modulated at the first modulation frequency and, based on the first sensor signal, to detect at least one insect in the detection volume and to determine at least one optically detectable attribute of the detected insect.

13. An apparatus according to claim 3, wherein the one or more insect sensor devices are one or more optical insect sensor devices and wherein the one or more detected attributes are one or more optically detected attributes.

14. An apparatus according to claim 3, wherein the detection volume is an enclosure-free space allowing unrestricted movement of living airborne insects into and out of the space.

15. An apparatus according to claim 3, the data processing system is configured to compute the index of insect biodiversity as a measure of variability of the detected attributes associated with respective detected insect detection events and/or based on a mathematical model, the mathematical model including a trained machine learning model.

16. An insect sensor device for detecting insects in a detection volume, the insect sensor device comprising:
an illumination module configured to illuminate the detection volume with illumination light comprising light at a first wavelength band modulated at a first modulation frequency;
a detector module comprising a detector configured to detect light from the detection volume; and
a processing unit configured to:

receive sensor signals from the detector module and configured to filter the received sensor signal to extract a first sensor signal modulated at the first modulation frequency based on the first sensor signal, detect one or more insect detection events, each insect detection event being indicative of at least one insect in the detection volume and to determine at least one optically detectable attribute of the detected insect associated with respective detected insect detection events, wherein the detected insect detection events are taxonomically unclassified, and compute an index of insect biodiversity directly from a plurality the detected attributes associated with the taxonomically unclassified detection events.

17. An insect sensor device according to claim 16, wherein the illumination light further comprises light at a second wavelength band, different from the first wavelength band, modulated at a second modulation frequency, different from the first modulation frequency, wherein the processing unit is further configured to filter the received sensor signal to extract a second sensor signal modulated at the second modulation frequency and, based on the first and second sensor signals, to detect at least one insect in the detection volume and to determine at least one optically detectable attribute of the detected insect.

18. An insect sensor device according to claim 16, wherein the illumination module comprises an array of light-emitting devices.

19. An insect sensor device according to claim 18, wherein the illumination module comprises a corresponding array of lenses for directing the light from the respective light-emitting devices as a diverging beam along an illumination direction.

20. An insect sensor device according to claim 16, wherein the processing unit comprises one or more lock-in amplifiers for extracting the first sensor signal.

21. A system of insect sensors, comprising:
a plurality of insect sensor devices configured to be individually positioned within a geographic area, each of the plurality of insect sensor devices configured to:

monitor insect activity within a three-dimensional detection volume extending outside the insect sensor device, wherein the detection volume is an enclosure-free void allowing unrestricted movement of living airborne insects into and out of the void, and output detector data indicative of one or more detected attributes associated with respective detected insect detection events, each insect detection event being indicative of one or more insects being present in the detection volume, and a data processing system communicatively coupled to the plurality of insect sensor devices and configured to:

receive detector data from respective ones of the plurality of insect sensor devices, the detector data being indicative of one or more detected attributes associated with respective detected insect detection events, wherein the detected insect detection events are taxonomically unclassified, and compute an index of insect biodiversity directly from a plurality the detected attributes associated with the taxonomically unclassified detection events.

22. A system according to claim 21,
wherein the plurality of insect sensor devices is a plurality of insect sensor devices, each configured to monitor insect activity within a three-dimensional detection volume extending outside the insect sensor device by detecting light from the detection volume, and wherein the one or more detected attributes are one or more optically detected attributes.

23. A system according to claim 21, wherein each insect sensor device comprises a detector module and a processing unit, the processing unit being configured to receive and process sensor signals from the detector module, and wherein the detector modules and/or the signal processing performed by the processing units of the respective insect sensor devices is calibrated according to a detector reference that is uniform across the plurality of insect sensor devices.

* * * * *

UNITED STATES PATENT AND TRADEMARK OFFICE
CERTIFICATE OF CORRECTION

| | | |
|---|---|---|
| PATENT NO. | : 12,239,105 B2 | Page 1 of 1 |
| APPLICATION NO. | : 17/904422 | |
| DATED | : March 4, 2025 | |
| INVENTOR(S) | : Klas Rydhmer et al. | |

It is certified that error appears in the above-identified patent and that said Letters Patent is hereby corrected as shown below:

In the Claims

In Column 33, Claim 3, Line 32, please remove "optical" from the end of the line.

In Column 36, Claim 22, Line 26, please insert --optical-- before 'insect sensor devices'.

Signed and Sealed this
Sixteenth Day of December, 2025

John A. Squires
*Director of the United States Patent and Trademark Office*